(12) United States Patent
Yoshimura et al.

(10) Patent No.: US 8,569,657 B2
(45) Date of Patent: Oct. 29, 2013

(54) SOLDERING IRON WITH REPLACEABLE TIP

(75) Inventors: Kayoko Yoshimura, Osaka (JP); Takashi Uetani, Osaka (JP); Takashi Nagase, Nara (JP); Hiroyuki Masaki, Osaka (JP)

(73) Assignee: Hakko Corporation, Osaka (JP)

( * ) Notice: Subject to any disclaimer, the term of this patent is extended or adjusted under 35 U.S.C. 154(b) by 15 days.

(21) Appl. No.: 13/430,373

(22) Filed: Mar. 26, 2012

(65) Prior Publication Data

US 2012/0301611 A1  Nov. 29, 2012

Related U.S. Application Data

(60) Division of application No. 11/138,656, filed on May 25, 2005, now Pat. No. 8,237,091, which is a continuation-in-part of application No. 10/855,800, filed on May 26, 2004, now abandoned, which is a continuation-in-part of application No. 10/719,001, filed on Nov. 21, 2003, now Pat. No. 7,030,339, said application No. 11/138,656 is a continuation-in-part of application No. PCT/US2004/016633, filed on May 25, 2004, and a continuation-in-part of application No. 10/719,001, filed on Nov. 21, 2003, now Pat. No. 7,030,339.

(30) Foreign Application Priority Data

Nov. 26, 2002 (JP) ................................. 2002-342823

(51) Int. Cl.
*B23K 3/03* (2006.01)
*B22F 3/16* (2006.01)

(52) U.S. Cl.
USPC .............................................. 219/229; 228/54

(58) Field of Classification Search
None
See application file for complete search history.

(56) References Cited

U.S. PATENT DOCUMENTS

| | | | | |
|---|---|---|---|---|
| 1,667,618 A | * | 4/1928 | Abbott | 228/54 |
| 4,560,101 A | * | 12/1985 | Wilhelmson et al. | 228/54 |
| 4,974,768 A | * | 12/1990 | Ebata | 228/54 |
| 5,408,072 A | * | 4/1995 | Nagase | 219/616 |
| 5,579,533 A | * | 11/1996 | Weller | 419/28 |
| 6,386,423 B1 | * | 5/2002 | Adler et al. | 228/54 |
| 6,818,862 B2 | * | 11/2004 | Uetani et al. | 219/229 |
| 7,030,339 B2 | * | 4/2006 | Nagase et al. | 219/229 |
| 7,490,751 B2 | * | 2/2009 | Nagase et al. | 228/51 |
| 7,626,140 B2 | * | 12/2009 | Shigekawa | 219/229 |
| 2004/0065653 A1 | * | 4/2004 | Uetani et al. | 219/229 |

(Continued)

FOREIGN PATENT DOCUMENTS

| JP | S49-42239 | 11/1974 | | |
|---|---|---|---|---|
| JP | 04356361 A | * 12/1992 | | B23K 3/02 |
| JP | A2004-330229 | 11/2004 | | |

*Primary Examiner* — Joseph M Pelham
(74) *Attorney, Agent, or Firm* — Squire Sanders (US) LLP

(57) ABSTRACT

A soldering iron (and a desoldering iron) with a replaceable tip, which is releasably securable on the forward heat-conducting end of a soldering (or desoldering) iron heat assembly. The tip has a heat conducting core in a tip cap. Methods of manufacturing and using the tip are also disclosed. A method of manufacturing a replaceable soldering or desoldering iron tip can comprise preparing a cap having a base opening and at least substantially filling the cap through the base opening with a heat conducting material so that a tip core is formed in the cap, the tip core having a core face at the base opening.

21 Claims, 14 Drawing Sheets

(56) References Cited

U.S. PATENT DOCUMENTS

2004/0222206 A1\* 11/2004 Nagase et al. ............... 219/229
2004/0226981 A1\* 11/2004 Nagase et al. ................ 228/51
2004/0226982 A1\* 11/2004 Nagase et al. ................ 228/51
2006/0022018 A1\* 2/2006 Yoshimura et al. ............ 228/54
2010/0072260 A1\* 3/2010 Stiller et al. .................... 228/54

\* cited by examiner

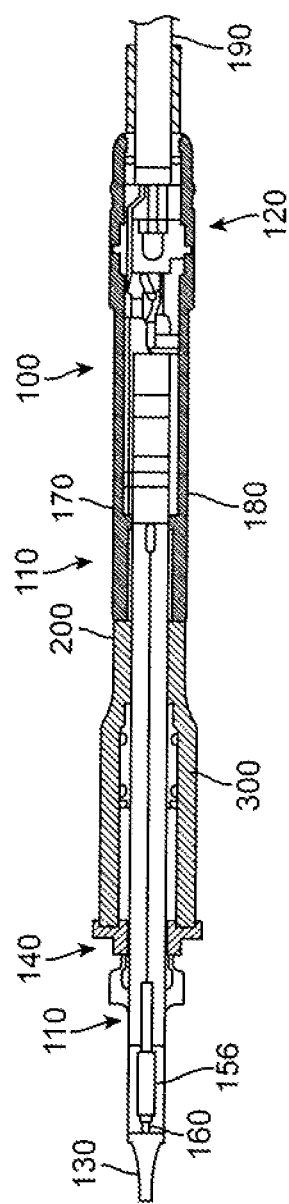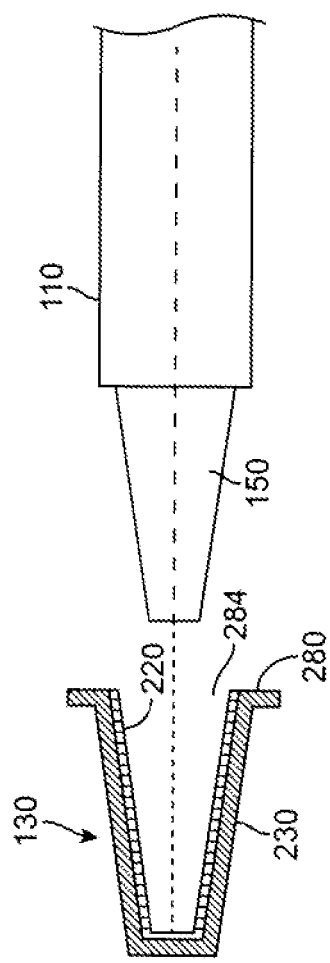

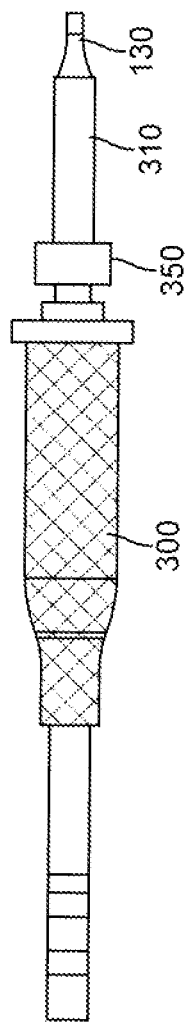
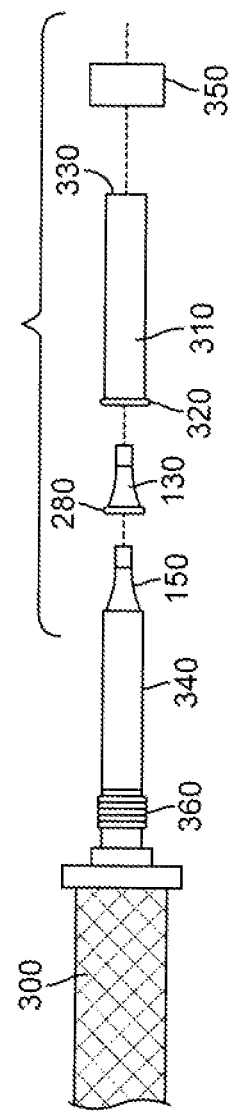
FIG. 2
FIG. 3

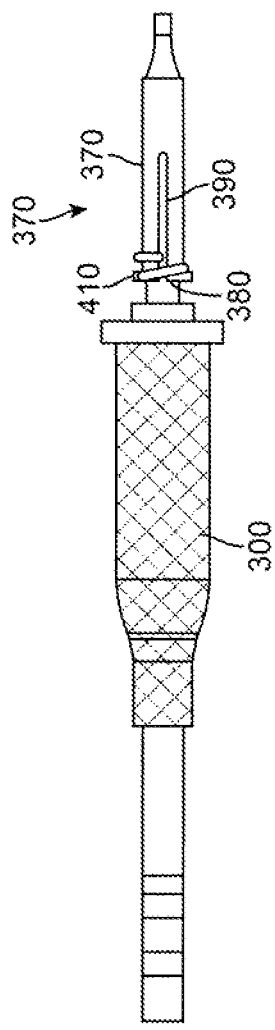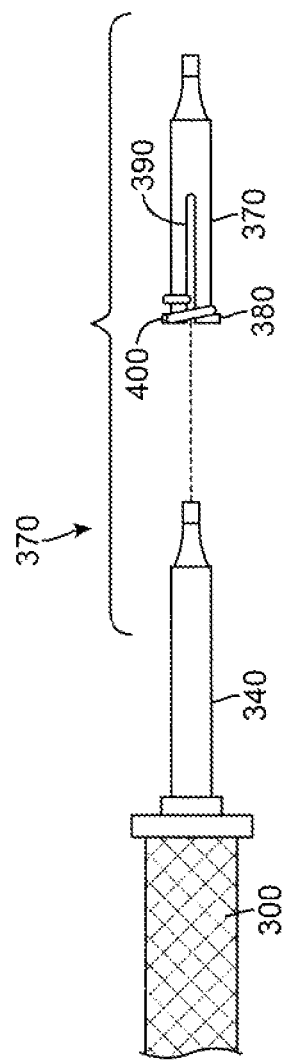

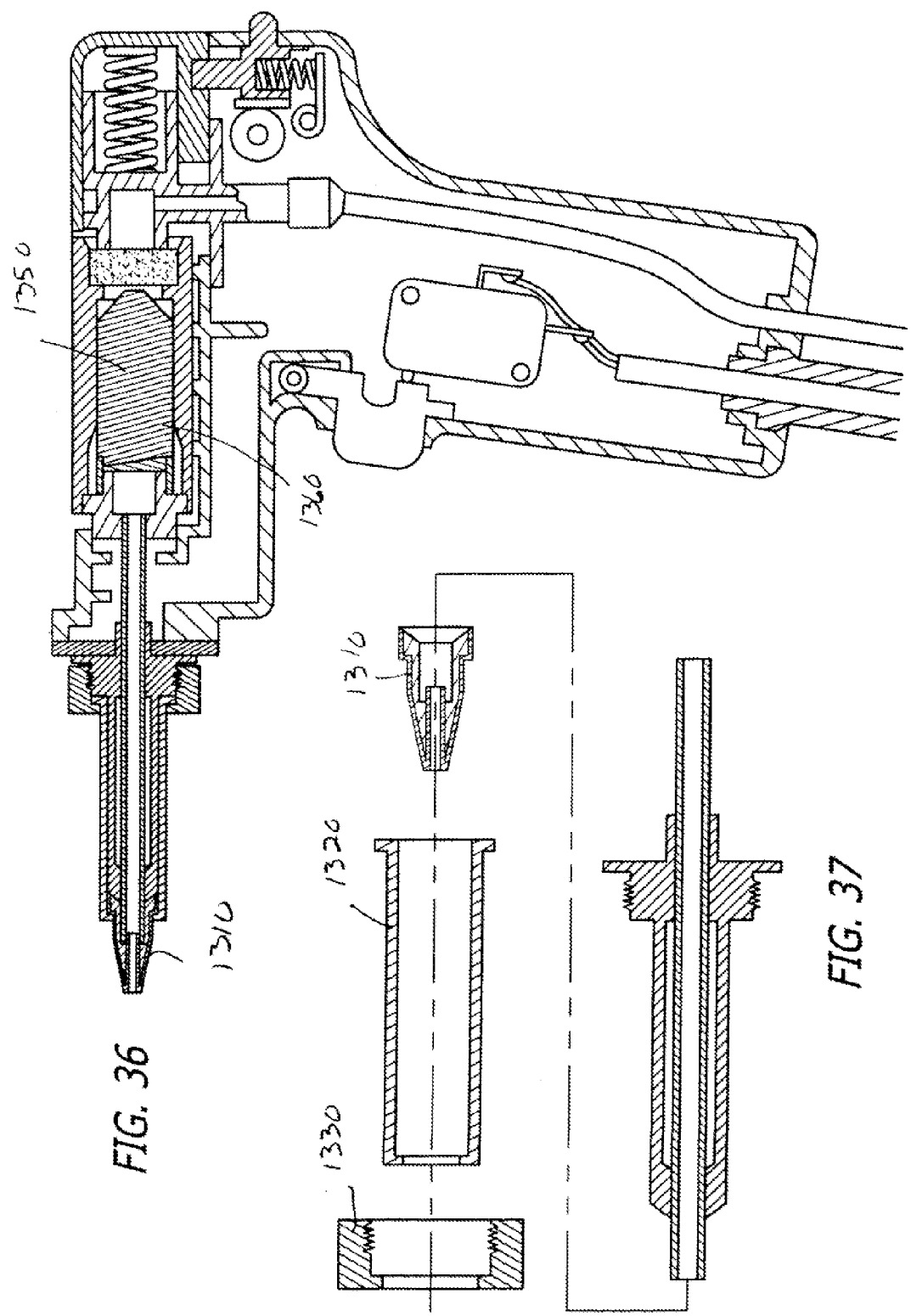

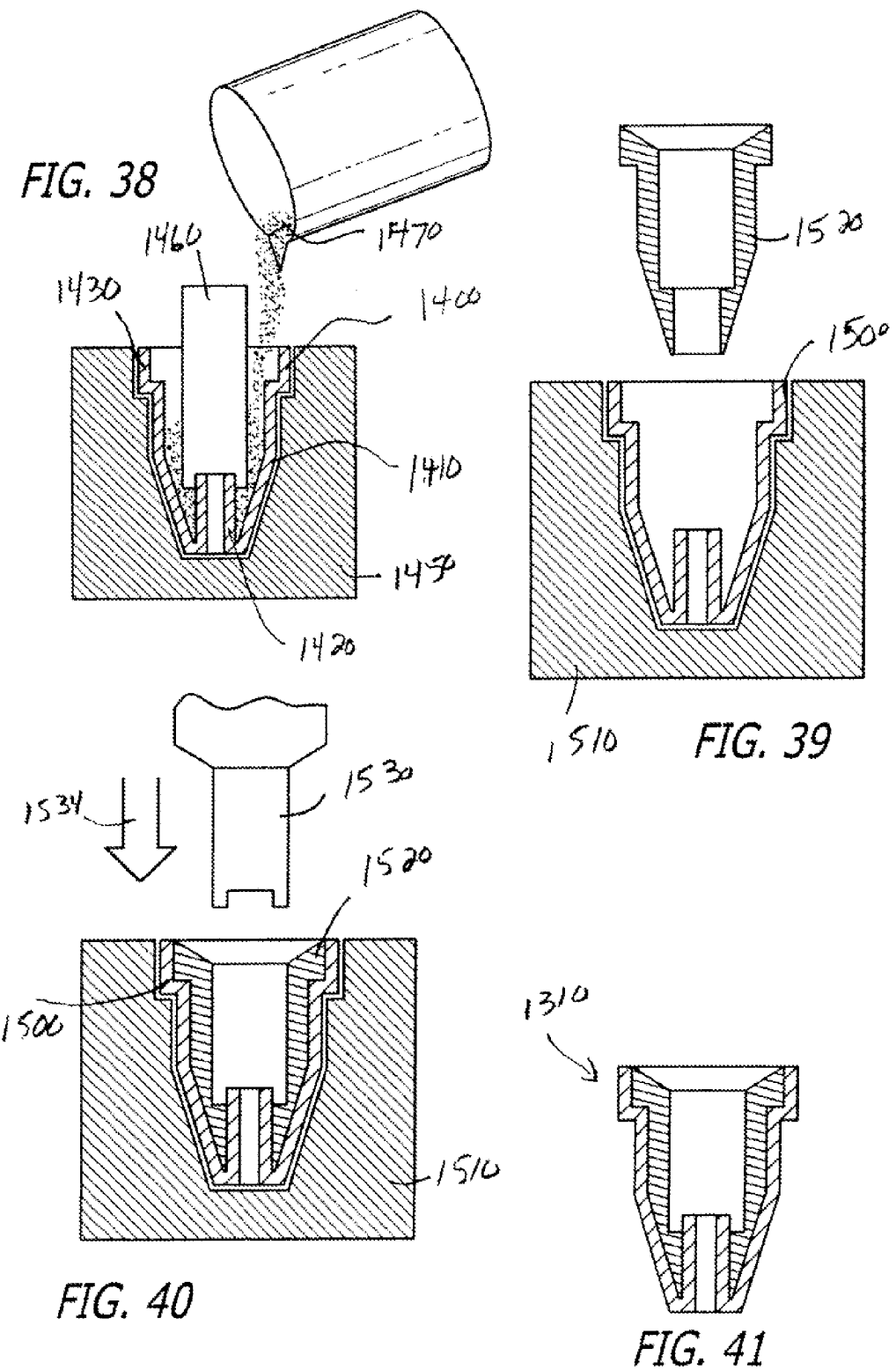

SOLDERING IRON WITH REPLACEABLE TIP

CROSS REFERENCE TO RELATED APPLICATIONS

This is a divisional of prior application Ser. No. 11/138,656, filed May 25, 2005, which is: (1) a continuation-in-part of application Ser. No. 10/855,800, filed May 26, 2004 (abandoned), which is a continuation-in-part of application Ser. No. 10/719,001, filed Nov. 21, 2003, now U.S. Pat. No. 7,030,339; (2) a continuation-in-part of international application no. PCT/US2004/016633, filed May 25, 2004; and (3) a continuation-in-part of application Ser. No. 10/719,001, filed Nov. 21, 2003, now U.S. Pat. No. 7,030,339. The entire contents of all the above-identified applications are incorporated herein by reference for all purposes.

BACKGROUND OF THE INVENTION

Soldering is a method for connecting and bonding components to provide secure electrical connections in the electronics industry. Soldering can be roughly classified into two categories, namely, mass soldering (batch soldering) and manual soldering. Mass soldering includes wave or flow soldering wherein electrical elements or components are mounted on a printed circuit board and then the printed circuit board is passed over a molten solder bath in a manner that allows selective contact with the solder. Mass soldering further includes reflow soldering (SMT) wherein solder particles and flux are mixed with a binder or additive to form a solder paste. The solder paste is printed on the circuit board, and the elements are then mounted on the circuit board and heated so as to solder them. Both of these methods allow simultaneous soldering of multiple points.

Manual soldering using an electric soldering iron allows an individual user to perform soldering operations. Manual soldering can be used following the mass soldering methods described above, to repair localized defective soldering, or to solder parts which cannot be soldered with the mass soldering methods.

Conventional soldering iron tips for electric soldering irons are made of copper or copper alloys and their forward ends are iron plated to a thickness of from thirty to fifty micrometers up to five hundred to eight hundred micrometers, in order to prevent solder corrosion of the copper. This iron-plated area is then coated or wetted with solder, and soldering operations are performed therewith.

In the past it was common for the principal components of solder to be tin and lead (Sn—Pb solders of which Sn—Pb eutectic solder is representative thereof). However, in recent years due to environmental concerns, lead is less commonly used and so-called lead-free solders have been more frequently used. Examples of lead-free solders are Sn—Cu solders, Sn—Ag solders, and Sn—Ag—Cu solders.

As compared to Sn—Pb solders, it is more difficult to achieve good solder joints with lead-free solders, due to inferior solder wetting and the difficulty of solder spreading. The primary causes of inferior solder wetting include the facts that the melting points are 20° C. to 45° C. higher than Sn—Pb solders and the iron tips of the soldering irons are more readily oxidized. Consequently, soldering work using manual soldering methods has suffered. Soldering defects are more likely to result with manual soldering which uses lead-free solder and thereby more frequent repairs are required. The present applicants have invented technology for improving soldering performance while maintaining substantially the same degree of solder corrosion durability of the soldering iron tip as prior iron plated soldering iron tips experienced with leaded solder. This is described in patent document A JP-2000-317629, entitled "Soldering Iron Tip" and filed on May 10, 1999. As described in this document, instead of conventional iron plating, an Fe—Ni alloy plating is used at the forward end of the soldering iron tip, or an Fe—Ni alloy covering member (a bulk material) is provided to improve soldering performance.

Furthermore, soldering related operations include desoldering wherein (electric) solder suction devices are used to remove undesired solder. These devices have a suction nozzle that is heated such as by a built-in heater, and the end of the heated suction nozzle is contacted with the solder to thereby melt it. The molten solder is suctioned into the interior of the desoldering tool through an opening at the end of the suction nozzle. The suctioning is performed by a vacuum pump or the like, and the molten solder is stored in a tank (or a capsule) having a filter provided in the suction passageway thereto.

With respect to the function of melting solder when the heated tip contacts the solder, and the requirement of good solder wetting in order to maintain good heat transfer characteristics, the suction nozzle of the electric solder suction device is similar to the soldering iron tip of an electric soldering iron, and similar iron plating is typically used at the forward end thereof. Similar to the soldering iron tip of the electric soldering iron, desoldering tip corrosion is to be prevented and solder wettability is to be maintained, even when using lead-free solder.

The tips of soldering irons wear out quickly, and therefore most industrial soldering irons are designed so that the tip can be replaced as needed instead of always replacing the entire soldering iron when the tip erodes or otherwise wears out. There are basically three different types of replaceable tip designs in the prior art, as discussed below.

The first type is one where an elongate tip is releasably held inside an elongate heater. An example thereof is disclosed in U.S. Pat. No. 5,422,457 (Tang et al.). (This patent and all other patents, publications and applications mentioned anywhere in this disclosure are hereby incorporated by reference in their entireties.)

The second type is shown, for example, in U.S. Pat. No. 5,248,076 (Eisele et al.). It includes a tip which is fitted over a temperature sensor and heater extending out from the soldering iron body.

The third type is shown in U.S. Pat. No. 6,054,678 (Miyazaki) and U.S. Pat. No. 6,215,104 (Kurpiela et al.). The constructions shown therein are an entire heating unit including the tip sensor and heater, which are built as a one-piece device for better heat transfer than that of the second type. The entire unit is replaced when the tip, which can be a copper tip with an iron plating, becomes worn out. The unit can be pressed into a sleeve or pushed into a socket; and in other words, it is a composite tip having a built-in heater.

The soldering tips of the first two types have structures where the tips are either positioned into an opening in a heater as in the first type, or positioned onto a heater as in the second type. The heat for the soldering operation is conducted from the heater through the tip to the work area. The structures of these two types have a clearance or gap between the heater and the tip. Thus, the heat conduction is less than that of the soldering iron of the third type, which has a tip heater composite structure. Disadvantageously, the replaceable composite heater assembly of the third type has a high operating cost, because when the tip wears out the heater and sensor units must also be replaced.

Examples of soldering irons are U.S. Pat. No. 1,667,618 (Abbott), U.S. Pat. No. 29,039 (Patee), JP 2000-288723 (Matsuzawa), U.S. Pat. No. 4,568,819 (Stacconi), U.S. Pat. No. 6,019,270 (Boll et al.), U.S. 2004/0226981 (Nagase et al.), U.S. Pat. No. 6,793,114 (Dunham et al.), U.S. Pat. No. 6,513,697 (Sines et al.), U.S. Publication No. 2005-0092729 (Konishi et al.), Japanese Utility Model 2080187 published Nov. 30, 1994, U.S. Publication 2004/0222206 (Nagase, et al.), and U.S. Publication 2005/0011876 (Uetani, et al.).

SUMMARY OF THE INVENTION

A soldering iron or desoldering iron with a replaceable tip cap is herein disclosed. A replaceable tip cap is fitted on the forward heat conducting core end of a soldering or desoldering iron heat assembly. Conductive paste, powder or a low melting temperature material such as solder, can be sandwiched between the tip cap and the forward end to improve heat conductivity therebetween. An assembly which allows for the easy removal and application of a replacement tip cap can include a sleeve with tightening bolt, a coil spring sleeve, or a slotted compressible sleeve. The tip cap can thus be replaced when it finally fails, and the heat assembly unit need only be replaced when its performance degrades. For example, the tip cap (or the replaceable "tip" described later) can be replaced after between approximately 10,000 and 40,000 point soldering uses and the heat assembly unit after between approximately 10,000 and 40,000 point soldering uses.

The tip cap can be a metal particle sintered cap which includes a sintering base material, or a sintering base material and a sintering additive, wherein the sintering base material includes iron, nickel and/or cobalt particles. By using a sintered alloy having as its primary components iron, nickel and/or cobalt (which are elements from the same group having properties similar to iron), or a combination thereof, a soldering iron tip cap can be produced having good resistance to solder corrosion and good solder wettability. In particular, when the sintering materials are based on iron particles to which nickel particles are added, improved corrosion resistance and solder wettability as compared with iron particles alone can be obtained.

The above-mentioned iron particles used for the sintering base material can be iron powder preferably having a purity above 99.5%. Losses in thermal and electrical conduction and inferior soldering application characteristics or soldering removal characteristics due to impurities are thereby avoided. On the other hand, the density of the metal particle sintered body or member is advantageously increased. If the iron particles contain large quantities of impurities, such as carbon, oxygen, nitrogen or hydrogen, the corresponding density of the metal particle sintered member may be only about 90%; while if high purity iron particles are used, the resulting density is increased to 96% or greater.

The sintering base materials (iron particle, nickel and/or cobalt) in the metal particle sintered tip cap can comprise between 60% and 99.99% by weight percentage of the tip cap. This allows the properties of the sintering base material, which serves as the primary component, to be effectively used. Solder corrosion resistance and solder wettability are thereby significantly improved.

The metal particle sintered cap can include a sintering base material and a sintering additive wherein the additive is selected from the group of copper particles, silver particles, tin particles, boron particles and carbon particles. This allows not only for further improved soldering performance but also for a high density metal particle sintered body or member to be produced by sintering at relatively low temperatures and for the body or member to have good corrosion resistance. Copper, silver and tin have relatively low melting points, namely 1,083° C., 961° C., and 232° C., respectively, and can be used. Thus, even if the sintering temperature is set to a relatively low temperature, at least the tin particles melt in the sintering process, allowing liquid phase sintering, which fills in the gaps between the particles. In solid phase sintering, boron is interstitially diffused among the iron group elements, furthering mutual diffusion of the solids within each other, allowing sintering at a relatively low temperature of 1,100° C. Carbon when included can improve the solder corrosion resistance and significantly extends the working life of the tip.

The content of the sintering additive in the metal particle sintered cap can be between 0.01% and 40% by weight percent. Thereby, it is possible to establish the optimal amount to be added without the amount of the sintering additive being too small and its effect being insufficient and without being too large, resulting in defects.

The tip cap alternatively can be provided as a replaceable suction nozzle on a main body similarly provided with a heating element and also with a vacuum function. With the electric soldering iron or the electric desoldering tool thereby produced, it is possible to reduce the number of times that the soldering iron tip is replaced when applying or removing lead-free solder. Additionally, this construction provides for increased workability and also facilitates high quality soldering and solder removal even by people who are not highly skilled.

In addition to the soldering iron tip cap construction, another invention herein is the method of manufacturing of soldering iron tip caps for handling solder. The sintering base material or the sintering base material and the sintering additive, can be mixed with a binder. The binder materials would be mixed with the sintering base materials and sintering additives to an amount of approximately forty volume percent, or ten to forty weight percent. A shape substantially the same as the desired soldering iron member or a shape encompassing the shape thereof, is formed as a green compact by pressure molding. The green compact is fired in a non-oxidative (an inert gas) atmosphere at 800° C. to 1,300° C. to produce the desired metal particle sintered cap construction.

A step in the manufacturing process of the metal particle sintered cap is to further shape it by preform forging or powder forging at temperatures of 300° C. to 500° C. to produce the soldering iron forward member. This reduces the fine air cavities between the particles and the metal particle sintered cap, thereby increasing the density and improving corrosion resistance.

Further, instead of pressure molding, injection molding methods can be used to form the soldering iron tip cap. In this manner, a green compact can be easily shaped, even for relatively complex shapes that are difficult to make by compression molding. The need for subsequent machining is thereby reduced or eliminated and manufacturing productivity increased.

Liquid phase sintering can alternatively be used according to the present invention. Liquid phase sintering includes the firing temperatures being no less than the melting point of the sintering additive. This allows for high density metal particle sintered caps to be produced by sintering at a relatively low temperature. In other words, with liquid phase sintering, the particles having a lower melting point, melt in the sintering process and fill in the gaps between the metal particles. Thereby, a high density metal particle sintered cap can be produced, allowing for excellent solder application characteristics and solder removal characteristics. A power savings is also achieved since the sintering is at relatively low temperatures.

Another method of manufacturing a soldering iron tip cap of the present invention includes alloying the sintering base material and the sintering additive by a melting process and granulating the particles to produce an alloy particle. The metal particle mixing process thereby can be simplified, increasing manufacturing productivity.

A further manufacturing method of the invention is characterized in that the particle size of the sintering base material, the sintering additive or the alloy particle used is no greater than 200 μm. Alternatively, the particles used can be no greater than 50 μm. Even further, ultra-fine particles can be used as the sintering base material, the sintering additive or the alloy particle. By using small metal particles, the final density of the metal particle sintered body can be increased. Additionally, it is possible to improve the solder application characteristics or the solder removal characteristics, and to improve the corrosion resistance of the soldering iron tip.

However, it is difficult to form a tip cap whose thickness is less than approximately one thousand microns using pressing or extruding processes. Also, the density of caps formed using these methods will generally be ninety percent or less. Therefore, it is preferable to use metal injection molding to form the tip cap of this invention. Using this method, the tip caps can have a wall thickness of two hundred to eight hundred microns and a density after sintering of 96 to 97%.

Thus, according to one aspect of the invention a soldering iron heating system includes: a tip cap having an engagement and proximal portion; a connector sleeve having an engagement end distal portion; and mechanical holding means for releasably holding a proximal end of the sleeve to an elongate heating assembly, which includes a rod and a tapered heating tip at the end of the rod, with the proximal and distal portions engaged, with the connector sleeve on the rod and with the tip cap on and in thermal communication with a side surface of the heating tip and allowing the tip cap to be removed from the heating tip for replacement purposes. The system can further include heat conducting material sandwiched between the tip cap and the heating tip when the holding means is holding the tip cap on the heating tip. The holding means can include a nut secured to a proximal end of the sleeve and adapted to thread onto a threaded member of the heating assembly. Alternatively, the holding means can include threads on a proximal inside surface of the sleeve. The tip can have a bevel, conical, chisel or knife shape.

Instead of the replaceable component being the tip cap, it can be the tip wherein the tip includes the tip cap filled with a heat conductive core. The core has a rearward face dimensioned and configured to (releasably) mate with and against the forward heating face end of the heater sleeve.

According to one aspect of the present replaceable tip invention, a soldering (or desoldering) iron heating system, includes: an elongate heating assembly including a distal heating end having a heating end face; a replaceable working end tip including a heating tip core and a tip cap secured on the tip core; and the tip core having a proximal face configured to mate with the heating end face to provide thermal conduction from the heating end to the tip core. The tip cap can be a metal particle sintered tip cap, and the core can be a copper, copper alloy, silver or silver alloy core. The heating assembly can include a ceramic heater, a resistance wire heater or a heater cartridge. The heating end face can have a protrusion and the proximal face a recess configured to receive the protrusion. The proximal face can lie in the plane of the end face of the tip cap. The system can further include mechanical holding means (such as a sleeve means) for releasably holding the tip to the heating end.

According to a further aspect of the invention, a removable soldering (or desoldering) iron tip includes: a tip cap having a body portion having a working end and an open base, and a flange extending out from and around the base; and a conductive core in the body portion and having a rear face configured to mate with and against a forward heat conducting end of an elongate heating assembly. The body portion can have a chisel-type shape, a conical shape, a knife shape, or a bevel shape. The tip cap can have a length of between five mm and twenty mm. The tip cap can have a base opening whose diameter is between two mm to ten mm. The tip cap can have a wall thickness of between 200 micrometers and 800 micrometers. The rear face can lie in the plane of a rear face of the flange, and/or the rear face can include a recess for receiving therein a protrusion of the heat conducting end. The tip cap can include a suction opening and the core a desoldering through-passageway whereby the tip defines a removable desoldering iron tip.

Pursuant to yet another aspect of the invention, a method of assembling a soldering (or desoldering) iron can include releasably attaching a working end tip including a tip cap and a heat conducting core therein against and to a heat conducting working end of a soldering iron with a rearward face of the core in mating relation with a forward end heater face of the working end. The attaching can include attaching a rearward end of a coil spring, whose forward end is connected to the tip cap, to structure on the heating assembly. The attaching can include threading a nut onto a sleeve. The attaching can include sliding an expandable grip sleeve onto the forward end of the heating assembly. The soldering iron can include a heating unit and an electrical connector, the heating unit including a heater and a temperature sensor. The rearward face can lie in the plane of the rear end of the tip cap.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a cross-sectional elevational view of a soldering iron of the present invention;

FIG. 2 is an elevational view of the heating assembly of the soldering iron of the FIG. 1 illustrated in isolation;

FIG. 3 is an exploded perspective view of the forward portion of the heating assembly of FIG. 2;

FIG. 4 is a first alternative of the heating assembly of FIG. 2;

FIG. 5 is an exploded perspective view of the forward portion of the heating assembly of FIG. 4;

FIG. 8 is an enlarged exploded view of a forward end of the heating assembly showing the tip cap and conductive material in cross section;

FIG. 36 is a side cross-sectional view of a desoldering gun using a removable desolder tip embodiment of the present invention;

FIG. 37 is an exploded perspective view of the forward end of FIG. 36 showing the desoldering tip removed;

FIG. 38 illustrates a process for manufacturing the desoldering tip of FIGS. 36 and 37; and FIGS. 39-41 illustrate sequential steps of an alternative manufacturing process for the desoldering tip depicted in FIGS. 36 and 37.

DETAILED DESCRIPTION OF PREFERRED EMBODIMENTS OF THE INVENTION

Figure 6:
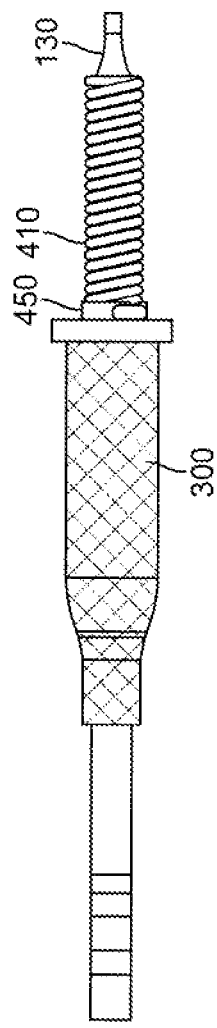
FIG. 6 is a second alternative of the heating assembly of FIG. 2.

Referring to FIG. 1, a soldering iron of the present invention is illustrated generally at 100. Soldering iron 100 includes a heating assembly 110 (or heating unit) shown generally at 110, a connector assembly 120, a replaceable soldering iron tip cap 130, and a holding assembly 140 for releasably holding the tip cap 130 on the tapered working tip 150 of the copper or copper alloy 154 of the heating assembly 110. The heating assembly 110 also can include a heating unit 156 and a temperature sensor 160. The heating assembly 110 is removable from the connector assembly 120 for replacement purposes. It is snap fit into the forward end of the connector assembly 120 and held therein, for example, by an O-ring 170. The soldering iron 100 of FIG. 1 and its construction, components and operation, can perhaps better be understood from U.S. application Ser. No. 10/264,718, filed Oct. 4, 2002, and entitled "Iron Tip And Electric Soldering Iron" (US 2004/0065653) and U.S. application Ser. No. 10/686,439, filed Oct. 14, 2002 (US 2004/0195228). The tip cap invention described herein can be used on many other prior or existing soldering irons as would be apparent to those skilled in the art. Examples of two of them are disclosed in U.S. application Ser. No. 08/798,467 entitled "Soldering Iron Tip and Its Producing Method," U.S. Pat. No. 5,579,833 (Wijkstrom), and U.S. Pat. No. 6,386,423 (Alder et al.).

The O-ring 170 snaps into a slot 180 on the end of the heating assembly 110. When inserted into the connector assembly 120, the heating assembly 110 is electrically coupled through the connector assembly 120 to a power supply via a power cord 190. The connector assembly 120 has a receptacle opening 200 which has both the O-ring 170 and electrical contacts in it. The user thereby can insert the heating assembly 110 into the receptacle opening until electrical contact is made. Then the heater assembly 110 is held therein with O-rings 170 within the slot. To release the heater assembly 110 from a receptacle opening 200 of the connector, the user pulls it out. This is shown, for example, in U.S. Pat. No. 6,710,305 (Lindemann et al.). Heat conductive material 220, as shown in FIG. 8 and described later in this disclosure in detail, on the inside surface of the tip cap 130, provides excellent thermal conduction from the working tip 150 to the tip cap 130.

Figure 9:
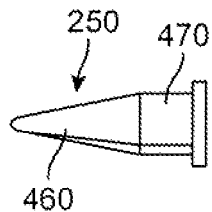
FIG. 9 is an elevational view of a first alternative tip cap of the present invention.
Figure 10:
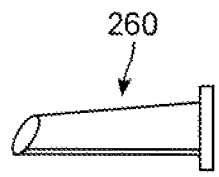
FIG. 10 is an elevational view of a second alternative tip cap.
Figure 11:
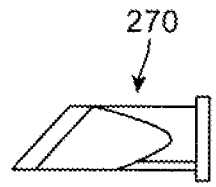
FIG. 11 is an elevational view of a third alternative tip cap.
Figure 12:
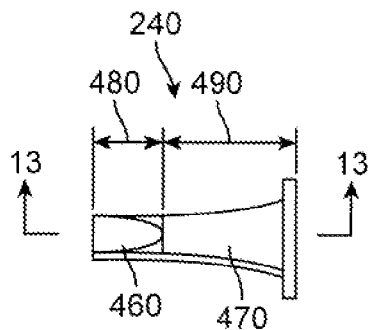
FIG. 12 is an elevational view of a fourth alternative tip cap or the tip cap of FIG. 1.
Figure 14:
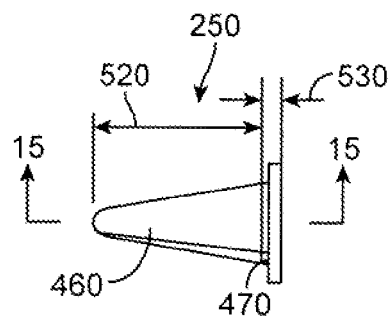
FIG. 14 is an elevational view of a fifth alternative tip cap.
Figure 13:
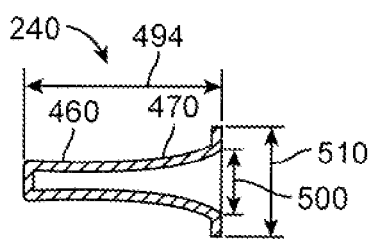
FIG. 13 is a cross-sectional view taken on line 13-13 of FIG. 12.
Figure 15:
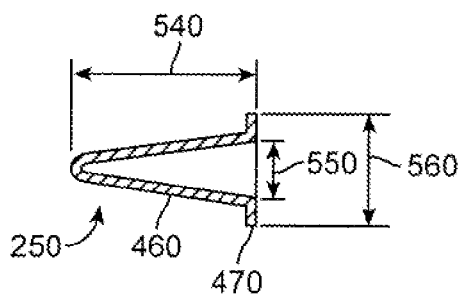
FIG. 15 is a cross-sectional view taken on line 15-15 of FIG. 14.

The tip cap 130 includes an upper portion or crown portion 230 having a thin wall of substantially constant thickness and whose interior and exterior surfaces are shaped to conform to the outside surfaces of the working tip 150. The upper or crown portion 230 can be configured in any shape known or apparent to those skilled in the art such as: a chisel type shape 240 as shown in FIGS. 12 and 13; a conical shape 250 as shown in FIGS. 9, 14 and 15; a beveled shape 260 as shown in FIG. 10; and a knife-shape 270 as shown in FIG. 11. A lip, flange or rim 280 as shown, for example, in FIG. 8 extends out from the base of the crown portion 230 and preferably extends the full circumference thereof, around the base opening 284. However, it is also within the scope of the present invention to omit the flange or to provide one or more spaced tabs in lieu of a continuous circumferential flange.

The heating assembly 110 also includes a circumferential grip or handle 300. The grip or handle 300 can be made of rubber, elastomers and plastics and a preferred material is a plastic material mixed with a antivirus material. This is described in U.S. Pat. No. 6,710,304 (Yokoo), as well as in U.S. patent application Ser. No. 10/348,684, filed Jan. 22, 2003 (U.S. Publication No. US 2005-0101691 A1).

The holding assembly 140 holds the tip cap 130 firmly to the working tip 150 so that excellent heat conduction is provided through the conductive material 220 sandwiched therebetween. Further, the holding assembly 140 is designed such that the tip cap 130 can be easily removed by a user when worn through erosion and replaced with a new tip cap. A preferred assembly of holding the tip cap 130 on to the working end 150 is best shown in FIGS. 2 and 3. Referring thereto, a sleeve 310 having a proximal flange 320 is provided. The sleeve 310 has a length and an inner diameter sufficient to enclose the heating unit 156; and for example, the length can be between ten mm and one hundred mm, and the diameter can be between three mm and twenty mm, and the sleeve can be made of stainless steel. At its forward end, the sleeve has inwardly projecting tabs or flanges.

To fit the tip cap 130 in place on the working tip 150, reference is now made to FIG. 3. The sleeve 310 is slid to the left of that figure over the tip cap 130 and then over the slender rod portion 340 of the working end 150 of the heating assembly 110. The lips or tabs 330 of the sleeve 310 engage the flange 280 of the tip cap 130 and pulling the tip cap 130 onto the working end 150. A nut 350 is then slid over the tip cap 130 and the sleeve 310 and then threaded onto the threaded portion 360 of the heating assembly 110 as seen in FIG. 3. When threaded in place the tip cap 130 is firmly held as shown in FIG. 2 on the working end 150. To remove the tip cap 130 after it is worn through soldering use, the nut 350 is unscrewed and the nut, sleeve 310 and tip cap 130 are removed. A replacement tip cap can then be fitted in place.

A first alternative holding assembly is the compressible gripping sleeve shown at 370 in FIG. 5. Referring thereto, it can be seen that the sleeve 370 has a rearward flange 380 and a one or more longitudinal slots 390 which engage the flange 380. The tip cap 130 is preferably affixed to the front end of the sleeve 370. A short coil spring 400 can be affixed to the rear portion of the sleeve 370. This sleeve 370 and tip cap 130 are slid into place along the rod portion 340 of the heating assembly 110 and the radial flexure of the slotted sleeve 370 and the gripping of the coil spring 400 hold the sleeve in place on the rod 340. To remove the tip cap 130, the sleeve 370 and tip cap combination are pulled off, slid off, of the working tip 150 by the user and replaced with a new one. Alternatively, the tip cap 130 and sleeve 370 can be separable components.

Figure 7:
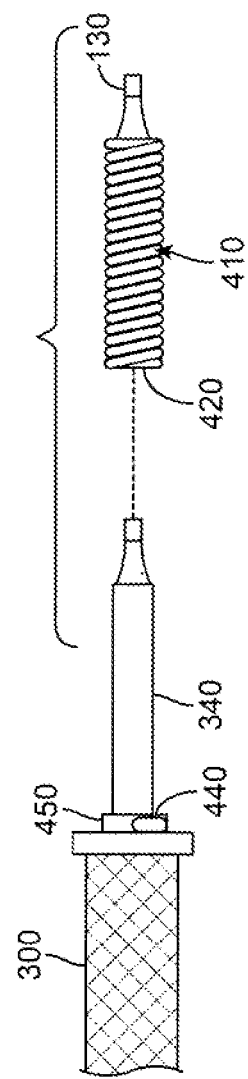
FIG. 7 is an exploded view of the forward portion of the heating assembly of FIG. 6.

A further alternative is a compressible member 410, preferably an elongated coil spring, which can be secured at its forward end to the flange 280 or the rearward portion of the tip cap 130. The coil spring 410 has a coil spring end tab 420 at its rearward end. To install the tip cap 130 on the soldering iron the spring tip cap unit as shown in FIG. 7 is slid onto the rod portion 340 and the end tab 420 of the coil spring 410 is fitted into the L-angled slot 440 on the collar 450 of the heating assembly 110, and pressed inwardly against the bias of the spring 410 and rotated into the L section of the slot. When the spring 410 is then released from its compressed state, the spring is held by tension in the slot 440 and the tip cap 130 is thereby releasably held in place on the working end tip 150. Alternatively, but less preferably, the coil spring 410 and tip cap 130 can be made as two separate components which are fitted and connected together by suitable means.

The length of the tip cap 130 can be five mm to twenty mm. It is preferably not longer than twenty mm since a strain is subjected to it during the sintering manufacturing process and the cost of the die needed to make it becomes expensive. For most shapes, the outer diameter of the base opening 284 is about two mm to ten mm. The thickness can be approximately two micrometers to eight-hundred micrometers. It preferably has a solder plating 460 on its working surface. This solder plating 460 can, for example, be a tin plating. The rearward non-working portion of the tip cap 130 can be chrome plated 470 to prevent the solder coming up past the effective working area of the tip cap 130. The tin plating 460 can be done before the chrome plating 470 or after, or the tin plating may be performed by a user.

For a chisel type configuration such as shown in FIGS. 12 and 13, the solder plating 460 thereon can extend rearward distance 480 of four mm but can vary from one mm to ten mm. A preferred dimension is four mm with chromium plating 470 extending a distance 490 of six mm for a total length 494 of ten mm as shown in FIG. 13. The interior diameter 500 can be four mm and the exterior diameter 510 of the flange can be five mm. For the conical tip type, as shown in FIGS. 14 and 15, the dimensions can be 6.5, 0.5, 7, 2.5 and 3.5 as depicted by reference numerals 520, 530, 540, 550 and 560, respectively.

The thin tip cap 130 can be made by metal injection molding or by press forming methods. These methods and various preferred and alternative materials are described later in this disclosure.

It can be appreciated that the interior surface of the tip cap 130 and the exterior surface of the working tip 150 must be the same shape and dimensions. Even under exacting manufacturing techniques, gaps will exist if the tip cap 130 is simply fitted on the working tool tip. These gaps reduce the heat conductivity. To manufacture the cap precisely and with no resulting gaps would be cost prohibitive. Further, because the soldering iron 100 is used under high temperatures of around 300° C. to 400° C., metal diffusion will occur at the contact areas and the two will join so that the cap 130 cannot be subsequently removed from the tool tip 150.

Consequently, the present invention advantageously and uniquely provides for the heat conductive material 220 (FIG. 8) to be sandwiched between the tip cap 130 and the working tool 150. The heat conductive material 220 provides for full heat conductive contact between the cap 130 and the working tool 150, filling in all of the gaps therebetween. The heat conductive material 220 also prevents the cap 130 from contacting the tool 150 and the consequent possibility of metal diffusion occurring.

Sufficient quantity of heat conductive material 220 needs to be provided to fill in this gap. For example, the material 220 can be such as to fill in a 0.1 mm gap around a four mm diameter tool working end and along a nine mm length of the cap 130. Thus, when the conductive material 220 is lead having a specific gravity of 11.34, the amount of the heat conductive lead material will be 0.14 gram. The preferred range can be between 0.01 gram to 10 grams, and more preferably the range can be 0.1 to 1 gram. It is difficult, though, to measure the precise amount needed. Further, the specific gravity will differ according to the material or the amount used according to the size of the gap.

There are basically two types of heat conductive materials 220 which can be used. One is the type that melts during use and the other is the type that is solid during use. The type that melts during use, such as solder, more easily covers the gaps. It, however, has the problem that the tip cap 130 needs to be replaced when the solder is in a melted state. This is because the solder solidifies when the temperature drops to room temperature and the tip cap 130 cannot be then removed and replaced. Examples of heat conducting materials 220 that melt during use are SN (melting point 232° C.) (hereafter M.P. 232C), SN-37PB (M.P. 183C), BI (M.P. 271C), SN-0.7CU (M.P. 227C), SN-3.5AG-0.7CU (M.P. 217C), SN-9ZN (M.P. 198C), SN-58BI (M.P. 138C), IN (M.P. 156C), and PB (M.P. 237C). These metals and metal alloys are generally called solders (except for Bi and In) and are commercially available as in line solders or paste solders. When these materials are used it is better that they be in a powder or paste state when applied. The preferred melting temperature is 100° C. to 350° C. Lower melting temperatures are preferred to prevent the user from burning himself when replacing the tip. More important than the melting temperature, is that the material 220 not react easily with certain metals since they contact the cap inner surface when melted or material that oxides quickly such as SN-9ZN.

The conductive material 220 can be in a number of forms when applied to the inner surface of the tip cap 130. (Alternatively, where appropriate the material can be applied to the tip surface of the working tool 150 in lieu of or in addition to application to the inside of the tip cap 130). The material can be a metal with a low melting temperature, such as solder. For the metal state, there are many paste solders that are mixed with flux and are commercially available. It can be in a powder form such as carbon, aluminum, copper or silver particles, and having a heat conductivity of between 0.01 and 1.0 (0.4814 W/mK). When in the powder form the particle size is preferably one to twenty micrometers. A third state is in a gel form having a good heat conductivity. The gel composition can be made by adding organic solvents such as alcohol, oil, flux or paraffin wax to the conductive material 220 to make it into a gel or a paste state. A paste or a gel type is easier to handle than a powder type when applying to the cap.

When the conductive material 220 is in a powder state, it can be inserted into the tip cap 130 using a utensil such as a spoon or in a tablet form using one or more tablets. When the conductive material 220 is in a paste state, it can be applied from a squeeze tube, from an injection syringe, from a dropper or using a cotton swab. After the gel has been inserted into the tip cap 130, the cap is pressed onto the end of the working tip 150 until the all the gaps therebetween are filled.

The heat conductive material 220 is generally easier to apply when in a gel state than when in a powder form. For example, the squeeze tube is first filled with material 220 and then the tube is squeezed to insert the gel material into the cap 130. It is preferable to apply excess material and then wipe off the excess heat conductive material 220 oozing out from the sides at the end of the cap than to not apply enough material.

Figure 16:
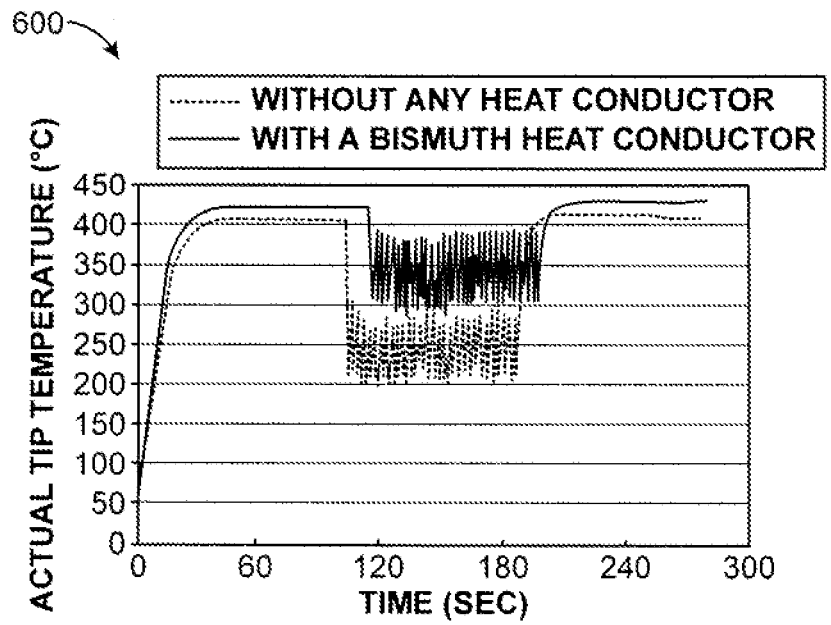
FIG. 16 is a graph showing heat characteristics with and without the tip cap heat conductive material such as shown in FIG. 8.

The importance of providing the conductive material 220 can be understood from the graph as shown generally at 600 in FIG. 16. Referring thereto, the tip temperature with respect to time using the heat conductor (the solid line) and without using the heat conductor (the dotted line) are shown with the tip cap invention herein.

Graph 600 was prepared from the results of the following tests. The actual tip temperatures of a MIM tip cap (Type T7-2.4D) using the same soldering iron were measured. Specifically, one sample had the MIM tip cap (130) fixed directly on the core working end tip without using any heat conductive material. The other sample used bismuth heat conducting material between the MIM tip cap and the working end tip. Sn—Pb eutectic solder wire having a 1.6 mm diameter was used. The cap temperature was controlled by setting the soldering iron at approximately 406° C. under the cap without any heat conductor. Five millimeters of soldering wire were fed at a single soldering. The soldering cycle was three seconds and the soldering frequency was thirty times. The soldering work was done on a one centimeter by one centimeter piece cut on the copper surface layer of a copper-clad, paper-base phenolic-resin printed wiring board (Sunhayato Brand #16). The temperature was measured by an Alumel-Chromel thermocouple spot welded about two mm from the cap tip.

As can be seen from graph 600, the sample which uses the conductor is superior to the other sample because (1) the start-up speed is faster; (2) the maximum temperature is higher by about 16° C.; and (3) the temperature drop during soldering is less. A smaller temperature drop is preferred. Generally, the tip temperatures are set between 350° C. to 400° C. Using for example solders that use 380° C., a greater effort is needed to lower the tip temperature even just 10° C.

Figure 17:
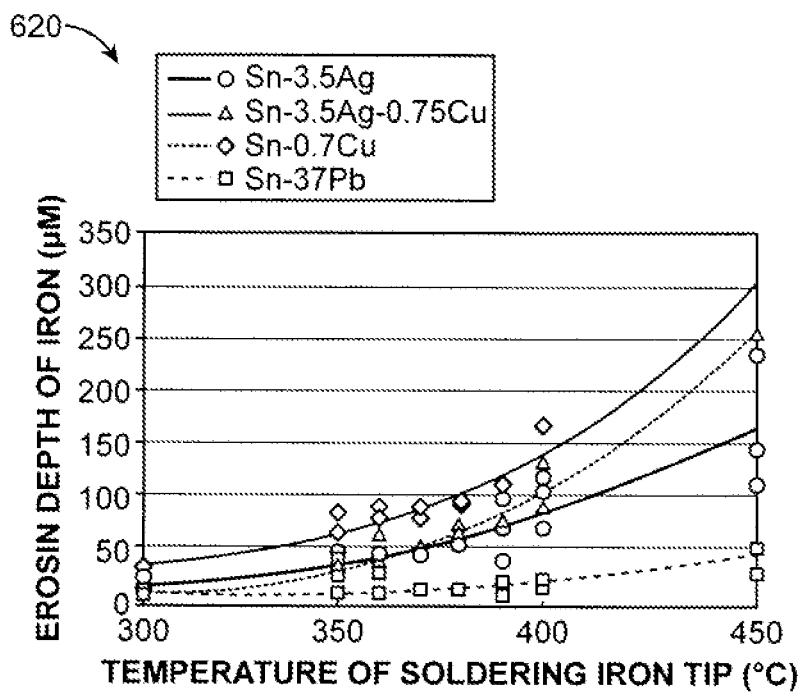
FIG. 17 is a graph showing temperature characteristics.

It is known that when a higher tip temperature is used, a greater amount of erosion in the tip results, making for a shorter working life for the tip. This is shown in the graph 620 of FIG. 17. For example, for Sn-0.7Cu when the tip temperature is lowered from 400° C. to 350° C., the amount of erosion is reduced by half. This makes it possible to extend the tip life of approximately twice as long. This characteristics applies not only to iron plated tips but also to (MIM) tip caps 130, such as those of the present invention. Generally any metal tip will have the characteristics as shown in the graph.

When the tip temperature is lowered, the problems of wetting and oxidizing the tip also improve. When soldering at high temperatures metallic compounds, between the cover pattern circuit and the tin; for example, are more likely to grow thicker. The Cu6Sn7 compounds grows inside the solder joint and the joint becomes less reliable. At best, soldering at lower temperatures has many advantages. This is described in detail as is the graph 620 of FIG. 17 in the Japanese article entitled "Damages of Soldering Iron by Lead-Free Solder and How to Reduce Damages of the Soldering Iron." The article was announced at the 10th Symposium on "Microjoining and Assembly Technology and Electronics" on Feb. 5, 2004, which was sponsored by Microjoining Commissions in Japan Welding Society. The article was published in "Proceedings of the 10th Symposium on Microjoining and Assembly Technology and Electronics," Vol. 10, 2004.

One of the advantages of a MIM tip cap 130 is that it can be used with a variety of solders including lead-free solders. The preferred material composition of the tip cap will vary according to the user's needs. The materials should have good wetability by solder as well as good resistance against erosion by molten solder. An example is a MIM tip cap that has a good wetability. Some MIM cap tips will have a better wetability but shorter working lives than ordinary tips made of iron plating. Others will have better working lives, but less wetability than ordinary tips made of iron plating.

There are two preferred materials. Materials that have good solderability include (a) Fe-2 wt. % to 50 wt. % Ni alloy (Iron-Nickel Alloy manufactured by MIM and sintering). Preferably Fe-10 wt. % Ni (Iron-10 weight percent nickel Alloy) (b) Fe-0.5 to 10 wt. % Cu-0.1 to 5 wt. % Ni-0.1 to 1.0 wt. % Ag Alloy (Iron-Copper-Nickel-Silver Alloy manufactured by MIM and sintering); preferably Fe—1 wt. % Cu—0.4 wt. % Ni—0.3 wt. % Ag (Iron—1 weight percent Copper—0.4 weight percent Nickel—0.3 weight percent silver Alloy). And materials that have good anti-erosion characteristics are Fe—0.05 to 1 wt. % C (Iron-Carbon Alloy manufactured by MIM and sintering); preferably Fe—0.4 wt. % C (Iron—0.4 weight percent Carbon Alloy).

In the past, to prevent the solder from extending up a soldering iron tip, which made the soldering less ineffective and less accurate, the tip was processed with chromium plating at the rearward of the working tip end. Unfortunately, after a number of soldering operations, the chromium plating gradually corroded or eroded as the tin in the solder ate the chromium plating (as well as the iron plating). Further, most of the active agents in flux contain chlorine which can also corrode the chromium plating. Thus, the chromium plating portion of the soldering tip according to the prior art can be eaten away, not only by the chlorine flux, but also by the tin solder. Additionally, it was difficult for the chromium plating to be applied without a gap between the soldering tip and the plated material. Further, chromium VI that is used for chromium plating is known to cause cancer and damage the health of humans and other living things.

Accordingly, the present invention provides for an alternative to the chromium plating of the prior art. Specifically, a flame or a plasma spray coating is used to spray various materials such as ceramics, cermet, and metals having high melting points on the working tip 150. Metals which perform well and have good adhesion to the copper core include SUS316 stainless steel and molybdenum (Mo). Examples of ceramics showing good performance are: Al2O3-2.5% TiO2, 62% CaO-33% SiO2, ZrO2-8% Y2O3, 70% Al2O3-29% MgO, Al2O3-40% TiO2, ZrO2-20% MgO, Cr2O3, ZrO2-4% CaO, and ZrO2-CeO3.

When using ceramic coating or plating, the adhesion and corrosion resistance of the ceramics can be improved if an undercoating is first applied. Examples of the undercoating are Ni—Cr, SUS316, Cr—Mo. Thermal spray coating may make the material porous, and a sealing coating can be used to close the holes.

Since the temperature of flame spray coating is generally too low to spray ceramics or high melting point metals, plasma spray coating is the preferred application technique.

The soldering iron tip can have a copper or copper alloy core having a base portion and the forwardly-extending portion 150. The end of the forwardly-extending portion can have the tip cap 130 of the present invention releasably applied thereto. The soldering iron tip 150 is first cleaned by degreasing, that is taking oil off its surface using acetone and/or a degreasing agent.

The surface of the soldering iron tip 150 is then roughened using steel grit blasting. The diameters of the steel grit particles are approximately 10-250 μm, preferably with an average of eighty μm and having a ten Morse hardness. The output of the blast machine can be approximately between 3.7 to 4.0 kgf/cm2, and the steel grit particle blast can be for about ten seconds. After the blast, the surface on the soldering iron tip can be cleaned to purge the steel from the surface since if steel is left on the surface the surface can rust. The cleaning can be done by jet air blasts.

To apply the plasma spray coating, the soldering iron tip 150 can be installed on a spinning machine and spun at between fifty and five hundred rpm. The injection nozzle for the sprayed material can be positioned about one-hundred millimeters from the spinning soldering iron tip. The temperature of the inside of the injection nozzle reaches 1,000 to 10,000 degrees Centigrade. The spraying can be done for about three cycles traveling right and then traveling back to the left from one edge of the base soldering iron tip core to the other. For example, when SUS316L is used as a spray coating material, the base material would have a twenty μm layer of SUS316L deposited for each cycle.

An undercoating can be applied to the surface of the base material to provide a stronger adhesion of the plasma-sprayed top coating material. If ceramic material is sprayed on the metal (copper) base material, the adhesion to the metal surface of the base material can be weak. This is especially true if the product used for the ceramic top coating is used under high temperatures (such as a soldering) and may cause exfoliation because of the difference of the expansion rate against the heat. Therefore, the material used for the undercoating should have an expansion rate which is between that of the top coating and that of the base material (e.g., copper). Ni-20% Cr can be used for the undercoating material. Alternative materials which can be used for heat resistance undercoating are (1) Ni, Co23%, Cr17%, Al2%, Y0.5% and (2) Co, Ni32%, Cr21%, Al8%, Y0.5%. The undercoating can be applied using the same technique as that for the top coating as described above.

Flame spray coating or plasma spray coating of a material may cause the sprayed material to be porous. To close or cover the holes specific coating agents can be used herein as a sealant. Examples are SiO2 and ZrO2, and they can be hardened by heating them at 180° C. for thirty minutes.

In addition to SUS316 and Mo, Al, Ni, Cu, W, Ti perform well as the coated metal material. The workable metals should be durable as to chlorine flux, not eaten away by tin solder and be capable of being plated without any gaps between the soldered tip and the plated material. The material also should not have wettability as to solder. Materials such as SUS316 and Ti have a strong oxidation film on their surface. Therefore, these materials do not make metallic compounds with the tin of the solder because of no wettability. These types of metals can be used as the material of the film having no wettability. All ceramics do not have wettability with solder. However, metals are superior to ceramics at the point of adhesion to the copper base material.

As mentioned above, ceramics advantageously do not have wettability with solder, but they do not adhere well to the base metal material. To solve this problem, the undercoating can be applied, as mentioned above. The following materials can be used as the undercoating:

| Material | Melting Point Degrees (Cent.) |
|---|---|
| $Al_2O_3$—2.5%$TiO_2$ | 1855 |
| 70%$Al_2O_3$—29%MgO | 2135 |
| $Cr_2O_3$ | 2265 |
| 62%CaO—33%$SiO_2$ | 1900 |
| Al | 650 |
| Ni | 1456 |
| Cu | 1083 |
| Mo | 2622 |
| W | 3382 |
| Ti | 1820 |

Next, components of the soldering iron tip cap 130 are described. The Table below is a component table showing the content by weight (%) of the particles used in the manufacture of the metal particle sintered tip cap 130. The vertical axis of the Table shows "types" assigned to different combinations of particles. Here, eleven types have been given by way of example, but other preferred combinations may be used, within the scope of the invention. The horizontal axis shows the types of powders actually used in the composition of the metal powder sintered cap. Particle types can be broadly classified into sintering base materials and sintering additives. At least one of iron (Fe), nickel (Ni), and cobalt (Co) is chosen as the particles for the sintering base material. Types 9 through 11 use only a sintering base material. In Types 1 through 8, in addition to the sintering base material, sintering additive particles, chosen from at least one of copper (Cu), silver (Ag), tin (Sn), boron (B), and carbon (C) are used. In the top half of each row, the percent by weight of the various particles used, with respect to the total particles, is shown, and in the bottom half, the preferred ranges (omitted for Types 9 through 11) are shown in brackets.

TABLE

| | Basic Sintering Material | | | | Sintering Additive | | | | | |
|---|---|---|---|---|---|---|---|---|---|---|
| Type | Iron (Fe) | nickel (Ni) | cobalt (Co) | total basic material | copper (Cu) | silver (Ag) | tin (Sn) | boron (B) | carbon (C) | total additive-- weight % |
| 1 | 93.2 (88-98.5) | — | — | 93.2 (88-98.5) | 5.5 (1.0-10.0) | 1.3 (0.5-2.0) | — | — | — | 6.8 (1.5-12.0) |
| 2 | 74.0 (60-88) | — | — | 74.0 (60-88) | 24.0 (10-38) | 11.0 (2.0-2.0) | — | — | — | 35.0 (12.0-40) |
| 3 | 90.7 (83-98.5) | — | — | 90.7 (83-98.5) | 5.5 (1.0-10.0) | 1.3 (0.5-2.0) | 2.5 (0-5.0) | — | — | 9.3 (1.5-17) |
| 4 | 94.5 (89-99.99) | 5.0 (0-10) | — | 99.5 (99-99.99) | — | — | — | 0.5 (0.01-1.0) | — | 0.5 (0.01-1.0) |
| 5 | 68.2 (38.0-98.5) | 25.0 (0-50) | — | 93.2 (88-98.5) | 5.5 (1.0-10.0) | 1.3 (0.5-2.0) | — | — | — | 6.8 (1.5-12.0) |
| 6 | 83.2 (68-98.5) | — | 10.0 (0-20) | 93.2 (88-98.5) | 5.5 (1.0-10.0) | 1.3 (0.5-2.0) | — | — | — | 6.8 (1.5-12.0) |
| 7 | 58.2 (18-98.5) | 25.0 (0-50) | 10.0 (0-20) | 93.2 (88-98.5) | 5.5 (1.0-10.0) | 1.3 (0.5-2.0) | — | — | — | 6.8 (1.5-12.0) |
| 8 | 99.2 (98-99.7) | — | — | 99.2 (98-99.7) | — | — | — | — | 0.8 (0.3-2.0) | 0.8 (0.3-2.0) |
| 9 | 100 | — | — | 100 | — | — | — | — | — | — |
| 10 | 58 | 42 | — | 100 | — | — | — | — | — | — |
| 11 | 54 | 28 | 18 | 100 | — | — | — | — | — | — |

For example, the components in Type 1 are 93.2% Fe/5.5% Cu/1.3% Ag. The preferred ranges for each of the components are Fe: 88-98.5%, Cu: 1-10%, Ag: 0.5-2%. The entries for Types 2-11 follow the same notation. The amounts of these particles used may be determined within the preferred range for each of the particles, but if a sintering additive is used, this is adjusted so that the total amount of the sintering base material is within the range of 60-99.99%, and the total amount of sintering additive is within the range of 0.01-40%. For example, the amounts of sintering additives in Type 2 may be determined within the ranges of Cu: 10-38% and Ag: 2-20%, but these are selected so that the totals thereof do not exceed 40%.

With regard to iron particles, which constitute a sintering base material, iron is an important (or indispensable) primary component for successful corrosion resistance. Consequently, iron particles are used in all of Types 1-11, and, in Type 9, only iron particles are used. However, as is also known from conventional iron-plating methods, impurities in iron negatively impact soldering performance; and therefore, iron powder having a purity of no less than 99.5% is used for the iron particles. When the iron particles have a high purity, losses in thermal and electrical conduction can be avoided, soldering performance improved, and the density of the metal particle sintered cap increased. If the iron particles contain large quantities of impurities, such as carbon (C), oxygen (O), nitrogen (N), or hydrogen (H), the corresponding density of the metal particle sintered body may be no greater than 90%, while in the present embodiment, which uses high-purity iron powder, the density is increased to no less than 96%.

Nickel particles and cobalt particles are also suitable choices as sintering base materials. Nickel and cobalt belong to the iron group, which is Group VIII of the Periodic Table. Accordingly, nickel particles and cobalt particles have similar characteristics to iron particles, and not only can they be used as a substitute material for iron, but characteristics superior to those of iron particles alone are demonstrated with certain combinations thereof. Nickel particles are used in Types 4, 5, and 10; cobalt particles are used in Type 6; and both are used in Types 7 and 11.

Fe—Ni sintered alloys, which use both iron particles and nickel particles as sintering base materials, produce sintered products with improved soldering performance, as compared with iron alone. In this case, the amount of nickel particles added is preferably no greater than 50%. If the amount of nickel particles exceeds 50%, the corrosion resistance is inferior and solder corrosion progresses rapidly.

Fe—Co sintered alloys, which use iron particles and cobalt particles as sintering base materials, promote sinterability and suppress solder corrosion. In this case, it is preferable that the amount of cobalt particles added be no greater than 20%. If 20% is exceeded, inferior soldering performance and increased cost result.

The use of 1-10% of copper particles as a sintering additive (Types 1, 3, 5, 6, and 7) not only improves solder wetting, but allows a high-density Fe—Cu sintered alloy to be produced due to liquid phase sintering, which is extremely efficient. Liquid phase sintering (in the case of copper) is a method wherein the sintering temperature is set to greater than the melting point of copper, which is 1083° C., so that the copper is liquefied during the sintering process. Preferably, 1-10% of copper particles are added; at less than 1%, the effect is small, and at greater than 10% when liquid phase sintering occurs, the formed product readily deforms as a result of local melting of the copper particles.

An Fe—Cu sintered alloy, in which greater than 10% of copper particles are added, may be used (Type 2). However, in this case, the temperature is set to less than the melting point of copper for the reasons given above. If prepared in this manner, while the corrosion resistance characteristics are slightly lowered, the thermal conductivity and the soldering performance are improved, making this suitable when soldering performance is more important than corrosion resistance. Furthermore, this Fe—Cu sintered alloy containing a large amount of copper particles is characterized by lesser decreases in thermal conductivity than solution alloys. For example, as compared to solution Fe-50% Cu alloys having an electrical conductivity of no greater than 20% IACS, these Fe—Cu sintered alloys show a high electrical conductivity of 50% IACS. This relationship is also proportional for thermal conductivity. It is preferable that no more than 40% of copper particles be added; generally if 40% is exceeded, solder corrosion increases.

If silver is used as a sintering additive (e.g., Types 1, 2, 3, 5, 6, and 7), a high-density Fe—Ag sintered alloy can be achieved as a result of liquid phase sintering at an even lower temperature than where copper particles alone are used. This is because the melting point of silver is lower than that of copper, at 960° C. Furthermore, in the Fe—Cu sintered alloy, having a large quantity of copper particles described above (Type 2), an Ag-28% Cu (eutectic temperature 780° C.) low melting point particle may be used. It is preferable that 0.5-20% of silver particles or silver-copper particles be added; if 20% is exceeded, production cost increases.

If tin particles are used as a sintering additive (Type 3), soldering performance is improved. Additionally, since tin has a low melting point of 232° C., liquid phase sintering can be achieved at an even lower temperature. In terms of adding tin particles in this manner, it is also effective to add copper particles and silver particles at the same time, as in Type 3. However, it is preferable to add no more than 5% of tin particles. If this amount is exceeded, the metal particle sintered body becomes weak as a result of compounds, such as $FeSn_2$, which are formed.

If boron particles are used as the sintering additive (Type 4), boron is interstitially diffused among the iron group elements, furthering mutual diffusion of the solids within each other, allowing sintering at the relatively low temperature of 1100° C. Adding a small amount of boron particles has the advantage of having substantially no negative effect on soldering performance, and it is preferable that 0.01-1% be added. At percentages less than this, the effect is small, and if the upper end of the range is exceeded, the soldering performance tends to deteriorate. In addition to adding boron particles alone, particles of alloys containing boron, such as Fe—B particles, Ni—B particles, or Cu—B particles, may be added.

If approximately 0.8% of carbon particles are used as a sintering additive (Type 8), the corrosion resistance of the soldering iron tip cap is greatly improved, and the life thereof can be greatly extended.

The metal particles used for the sintering base materials and the sintering additives described above suitably have a particle size of no greater than two hundred μm, preferably no greater than fifty μm; and still more preferably, they are ultrafine particles (that is, nano particles). By using such small metal particles, the density of the metal particle sintered body can be increased as well as the corrosion resistance and soldering performance.

A method of manufacturing the soldering iron tip cap is now described. In a first step, the sintering base material, the sintering additive, and a binder (additive agent) are mixed in a mixer. In a second step, this mixture is pressure molded in a press mold, an injection mold, or the like, to form a green compact (shaping). The shape of the green compact is roughly similar to the shape of the soldering iron tip cap. Thereafter, the green compact is removed from the mold; and in a third step, the green compact is sintered in a non-oxidative atmosphere at a predetermined temperature (800-1300° C.) to form a metal particle sintered body. In a fourth step, this body is machined to match to the soldering iron tip and to complete the soldering iron tip cap.

Sintering the soldering iron tip cap using powder metallurgy provides flexibility in its shaping, and allows a shape to be produced which is close to the final shape, so that final grinding procedures can be reduced or even eliminated. Furthermore, as compared to solution processes, it is not necessary to heat the green compact to the melting point of iron, which reduces the amount of energy used and the environmental impact. Thus, since discharge processing, such as when conventional iron plating was used, is not necessary, environmental damage is reduced, allowing for energy savings and mass production.

The molding indicated in the second step can be pressureless molding, wherein pressure is not applied. On the other hand, pressure molding increases the density of the green compact, which allows for an increase in the density of the sintered metal particle sintered body. Then, if liquid phase sintering is used, it is possible to achieve a metal particle sintered body with an even higher density. Liquid phase sintering is a method wherein particles are used for the sintering additive, which has a relatively low melting point (copper particles, silver particles, Ag-28% Cu eutectic particles (eutectic temperature 780° C.), tin particles, and the like), and sintering is performed at temperatures higher than these melting points.

When sintering additive particles are mixed into the sintering base material particles before pressure is applied, relatively large gaps are formed. After the pressure molding the sintering base material particles and the sintering additive particles are plastically deformed so as to be flattened, bringing the particles into close contact with each other but leaving small gaps. After liquid phase sintering, as a result of recrystallization, the sintering base material particles grow, and the gaps are filled by the sintering additive particles, which increases fineness. The reason for this is that, in addition to the solid state diffusion of the base material particles themselves, the sintering additive particles melt at the sintering temperature, wetting the sintering base material particles, while at the same time the gaps are filled by this liquid as a result of surface tension. In addition to producing such high-density metal particle sintered bodies, liquid phase sintering allows for sintering at relatively lower temperatures, thereby saving energy.

Furthermore, after sintering the metal particle sintered body, the body can be further shaped by preform forging or powder forging at 300-500° C. to produce the soldering iron tip cap, as would be apparent to those skilled in the art from this disclosure. By using these methods, the fine gas cavities between the particles can be reduced and the particle density thereby increased.

Figure 18:
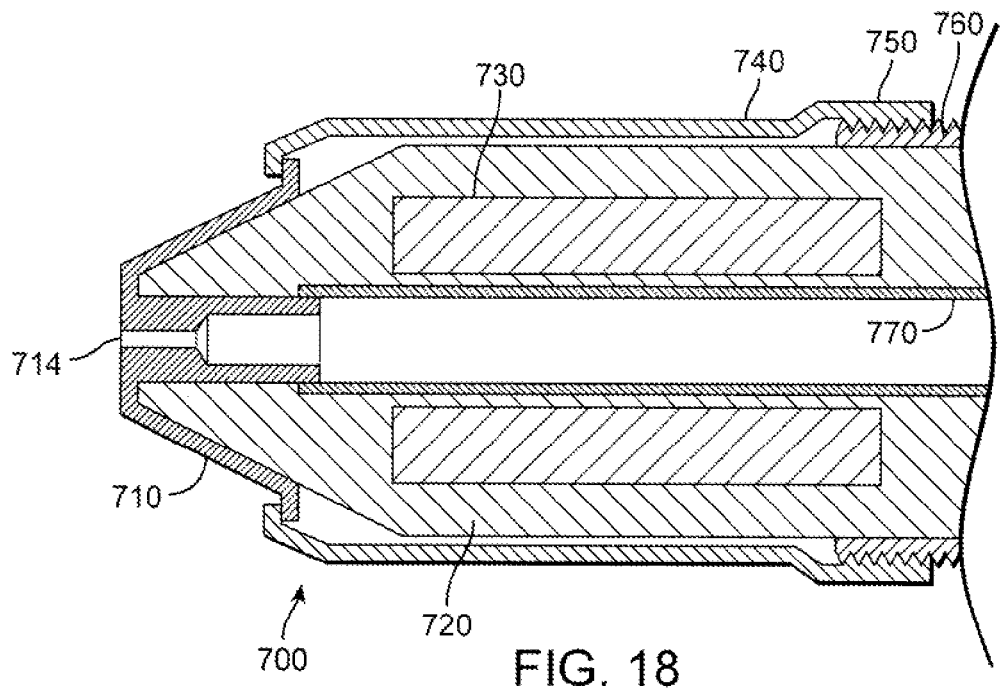
FIG. 18 is an enlarged cross-sectional view of a forward end of a desoldering iron of the present invention using a removable desoldering tip cap.
Figure 19:
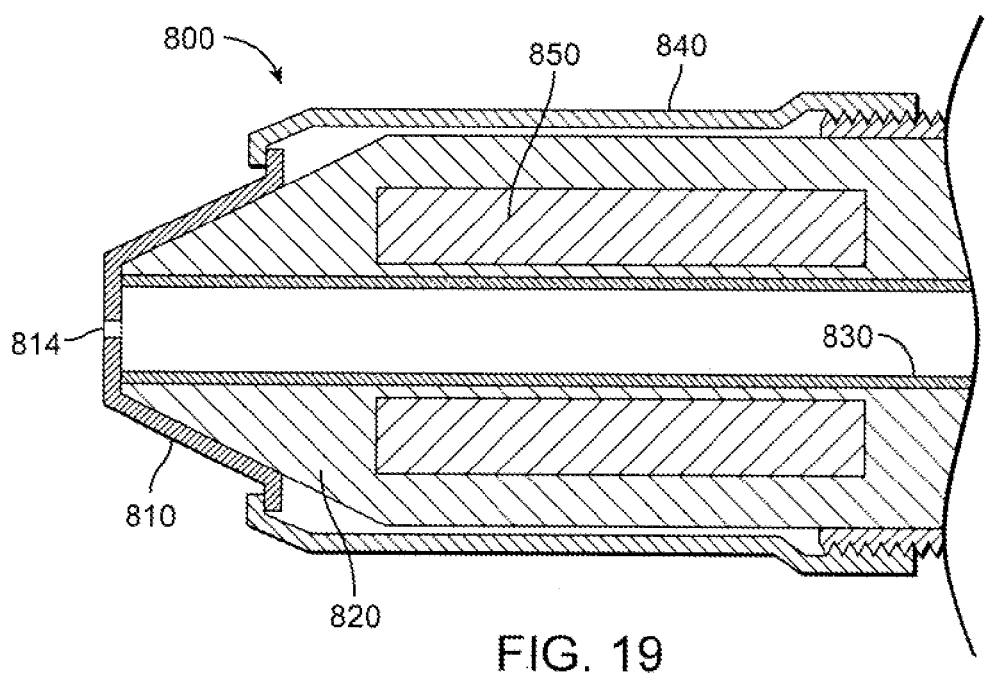
FIG. 19 is an alternative of the desoldering iron of FIG. 18.

The replaceable tip cap invention concept can be used for both soldering and desoldering iron tools. Examples of their use for desoldering tools are shown in FIGS. 18 and 19. Shown in FIG. 18 is a desoldering iron 700 including a tip cap 710 (having a central opening 714), a heating core 720 (which includes the working end), the heater and sensor 730, the fixing pipe or sleeve 740, the nut 750, the threaded member 760 (integrally formed with the sleeve), the stainless steel suction pipe 770 through which suction force is applied through a filter (not shown) by means of a vacuum pump (also not shown). An alternative embodiment is shown generally at 800 in FIG. 19. Referring thereto, the tip cap 810, the core 820, the stainless steel suction pipe 830, the sleeve 840, and the sensor and heater 850 are shown. Reference is made to U.S. Pat. No. 4,997,121 (Yoshimura).

An alternative to providing a replaceable cap on the forward tapered end of the tip core is to provide a replaceable tip which includes the tip core secured within the cap. This has the advantage over the replaceable tip cap embodiments discussed above in that those embodiments require high dimensional and shape accuracies between the interface of the cap and the outer face of the tip core. If they are not accurately shaped and dimensioned, gaps between them will be formed, reducing the heat conductivity from the copper core to the working surface of the cap. Additionally, many configurations of the composite tip heater cartridges must be prepared, because the wall thicknesses of the lower heat conductive caps cannot be increased to maintain soldering heat performance.

Figure 20:
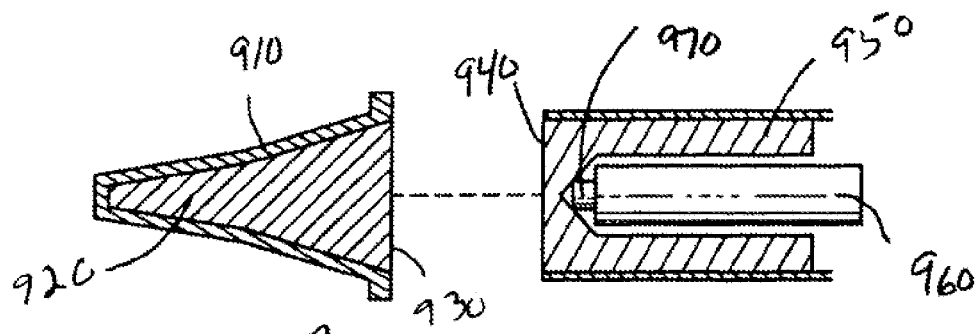
FIG. 20 is an exploded cross-sectional view of the forward portion of a heating assembly of the present invention showing a replaceable tip embodiment.
Figure 31:
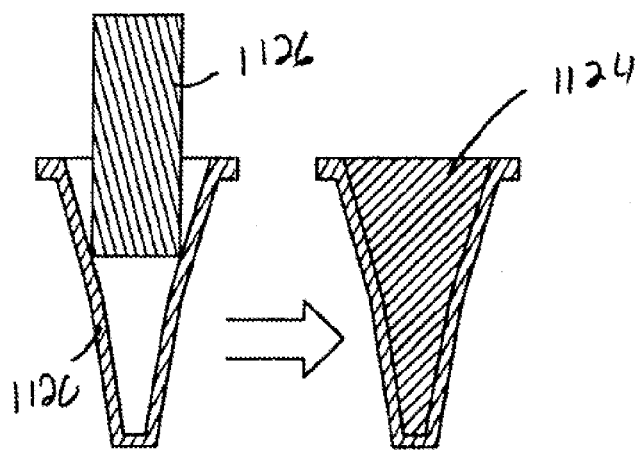
FIG. 31 illustrates a further alternative manufacturing process.

Thus, referring to FIG. 20, the replaceable tip 900 has a cap 910, such as a sintered cap as described in detail above, with a tip core 920 formed therein. A contact surface 930, in this embodiment a planar flat surface, then mates against the (flat planar) surface 940 of the heater sleeve 950. The heater sleeve 950 is shown surrounding the heater 960 and a temperature sensor 970 as is apparent from the previously-described embodiments. The tip 900 can be releasably secured to the flat planar surface of the sleeve by any of the techniques and constructions disclosed herein for the replaceable cap embodiments adapted as would be apparent to one skilled in the art for this replaceable tip embodiment. One example is shown in FIG. 31 and will be discussed later.

Thus, the soldering tip 900 as illustrated in FIG. 20 has a simple planar contact surface 930 for contacting the front of the heater sleeve 950 to provide efficient heat conduction from the heater 960 to the tip. The tip cap 910 can be a MIM sintered cap, and the tip core 920 can be made of copper, a copper alloy, silver or a silver alloy. The tip 900 is a replaceable component. Similar to the replaceable cap described above, the tip 900 can be inexpensively replaced without replacing the sensor heater, when the tip becomes worn. The tips can be sold individually packaged or multiple tips in a single package or container.

The planar surfaces 930, 940 between the tip core and heater sleeve contact directly without any gaps in between. An additional heat conductive material sandwiched between these two surfaces is thus not required when the tip and the sleeve are forcibly held together in close contact.

A process for manufacturing the tip of FIG. 20 will now be described with reference to FIGS. 21-23. The cap-shaped green compact 970 is prepared by metal injection molding. The compositions of the metal powders of the green compact are disclosed in U.S. application Ser. No. 10/719,001, published as US 2004-0222206 A1, and also U.S. application Ser. No. 10/855,800, published as US 2005-0011876 A1. A preferred example of one embodiment of the compositions is Fe-1% Cu-0.5% Ni-0.3% Ag. Metal powders 980 such as copper, copper alloy or silver, are pressed into the cap-shaped green compact and simultaneously sintered together. Instead of metal powders only, a compound mixture of metal powders and binders can be used. The compact filled with the powder can be sintered by heating at approximately 1400° C. on the mold 990, as shown in FIG. 22.

The copper powders melt in the cap 970 and fill it up following the cap's inner configuration. Thereafter, the face surface of the copper core at the cap opening end is made to be a planar surface or a surface having a recess with a press machine or a forging machine. Additional machining or grinding can be used if needed.

A less preferred alternative method of manufacturing the tip is to form the tip core first and then "coat" the tip cap on it, such as by conventional iron plating.

Figure 23:
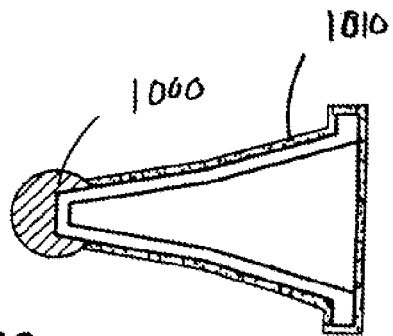
FIG. 23 is a view illustrating a further step of the manufacturing process.

Lastly, referring to FIG. 23, tin or solder 1000 is coated on the forward working end of this tip and an approximately ten to fifty micrometers thick chrome layer 1010 is plated except on the working portion of the tip cap. This coating process can be the same as that for ordinary soldering tips.

Figure 24:
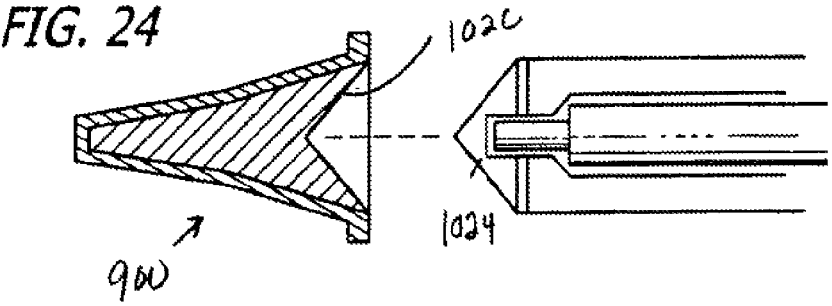
FIG. 24 is a view similar to FIG. 20 illustrating an alternative replaceable tip embodiment.

Alternatives or modifications to the tip and working end as shown in FIG. 20 will now be described. A first modification is illustrated in FIG. 24. It shows a tip having a tapered (or conical) recess 1020 wherein the tapered angle can be approximately 90° to 180°. This construction provides a larger contact area between the tip and the heater sleeve than that of the flat planar surfaces as shown in FIG. 20.

Figure 25:
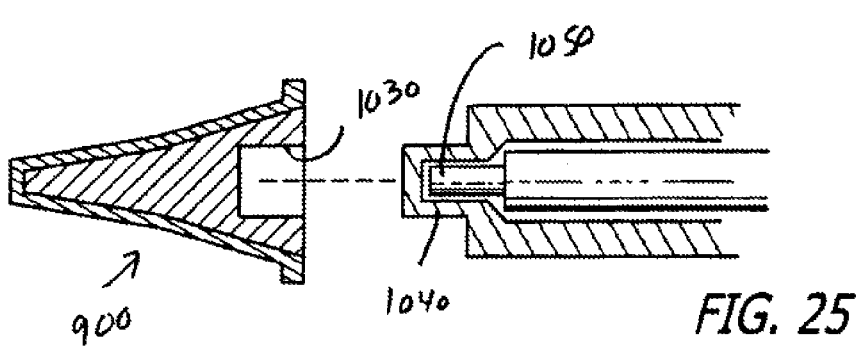
FIG. 25 is a view similar to FIG. 20 illustrating a further alternative embodiment.
Figure 26:
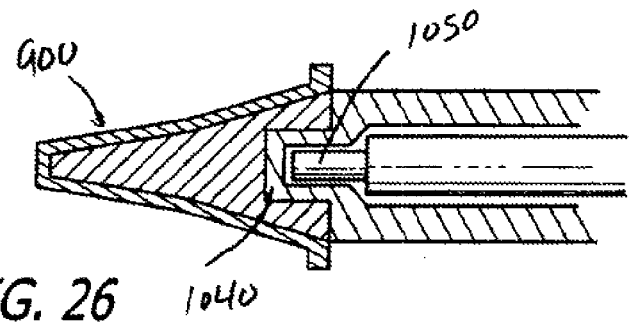
FIG. 26 is a view of the embodiment of FIG. 25 in an inserted position.

A further alternative or modification is illustrated in FIG. 20. Referring thereto, the tip has cylindrical bore 1030 for contacting with a cylindrical projection 1040 of the heater sleeve. The sensor 1050 can advantageously be positioned in this projection. This construction provides excellent heat response time because the closer the distance between the sensor and the tip working portion, the faster the sensor detects the temperature at the working portion of the tip and heating adjustments made. This is shown in FIGS. 25 and 26.

Figure 27:
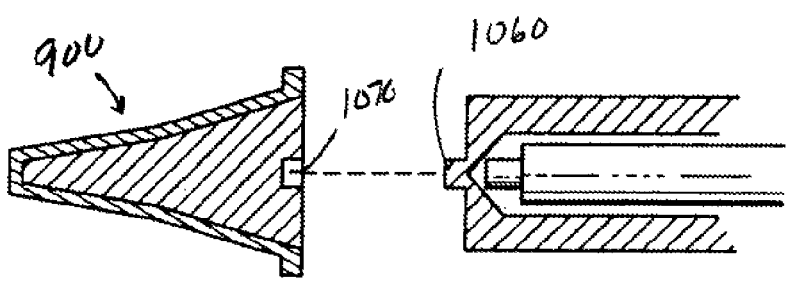
FIG. 27 is a view similar to FIG. 20 of a yet further alternative embodiment.
Figure 28:
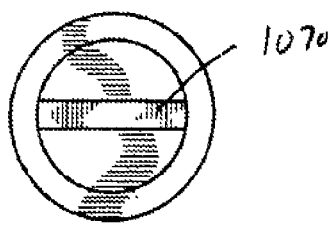
FIG. 28 is an end view of the tip of FIG. 27.

A further alternative is illustrated in FIGS. 27 and 28. And reference is hereby made to Masaki, application Ser. No. 10/874,856, published as US 2004-0232132 A1. This embodiment includes an elongate tip (or ridge) 1060 on the heater sleeve which fits into a corresponding elongate groove (or slot) 1070 in the rearward surface of the tip, more specifically the core. This ridge-slot mating maintains the tip in a consistent tip direction and positioning, which can be advantageous for machine built-in soldering irons as well as for hand-held soldering irons. In FIGS. 24-28, the heater assembly is illustrated as a ceramic heater structure by way of example. It can also be an electric resistance wire heater, cartridge heater or other type of heater as would be apparent to those skilled in the art. Reference is hereby made to U.S. Pat. No. 6,054,678 (Miyazaki).

Figure 29:
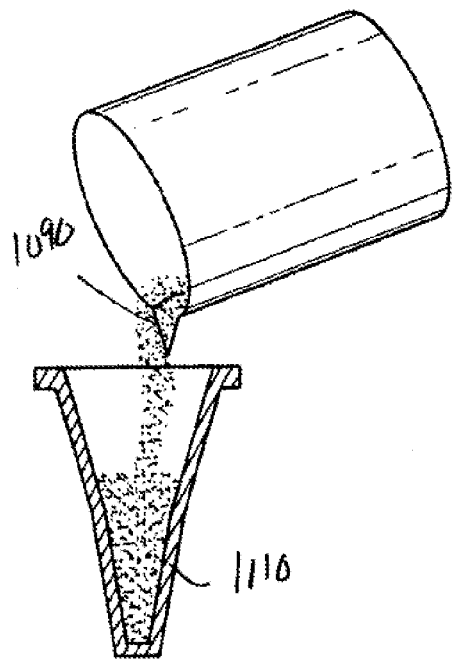
FIG. 29 is a view similar to FIG. 21 illustrating a first step of an alternative manufacturing process of the tip.

Alternative techniques for manufacturing the copper tip core are now discussed. Referring to FIG. 29, melted copper 1090 can be poured into the (sintered MIM) cap 1110. Alternatively, the melted copper can be scooped up with and into the cap. Subsequently, the melted copper can be solidified within the cap by cooling, without thereby forming any undesirable gaps between the cap and the solidified copper core. Reference is hereby made to U.S. Pat. No. 1,350,181 (Remane), which discloses the copper casting or melting within the iron mantel of a non-electric gas soldering iron.

Figure 21:
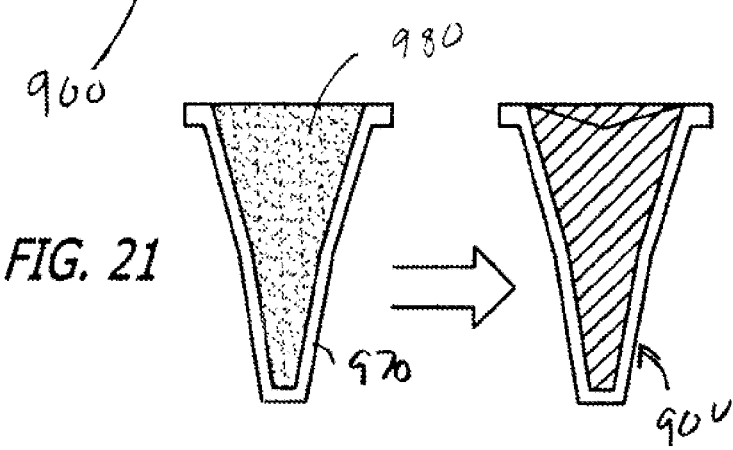
FIG. 21 is a side view illustrating preliminary steps of a manufacturing process of the tip of FIG. 20.
Figure 22:
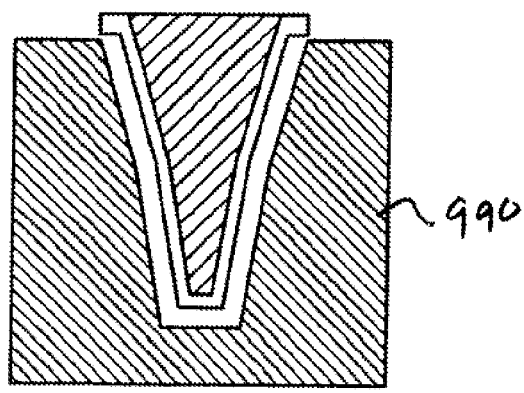
FIG. 22 is a view illustrating a subsequent step of the manufacturing process.
Figure 30:
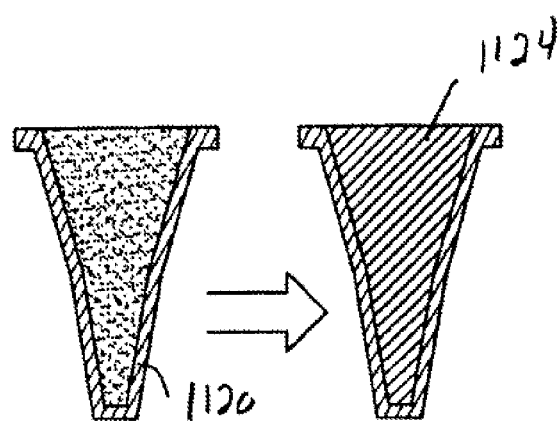
FIG. 30 illustrates subsequent steps of the manufacturing process of FIG. 29.

With reference to FIG. 21, it has been discussed above that the copper powder can be melted simultaneously when the cap is sintered from the green compact. On the other hand, a manufacturing method as shown in FIG. 30 is to sinter the cap 1020 and then fill it with copper powder or a copper powder and binder compound (or copper rod, copper block). After the copper powder or compound mixed with the powder copper and binders is filled into the cap, the filled cap is then melted or sintered to melt and secure the copper inside of the cap. Reference is now made to FIGS. 30 and 31 wherein the copper is melted by heating. The tip core is manufactured by the melting of the copper powder, the compound, rod or a block consisting of good heat conductive materials, such as copper, copper alloy or silver, within the sintered cap by heating in a furnace under a vacuum or a reduced atmosphere.

Figure 32:
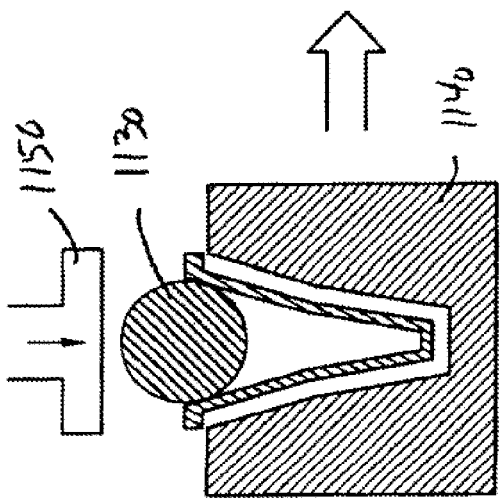
FIG. 32 illustrates steps of a yet further alternative manufacturing process.

FIG. 32 illustrates steps in a process of forging a copper block into a sintered MIM cap with a press machine. As shown, a copper block 1130 is positioned in the cap which is held in a mold 1140, and a pressing force 1150 is exerted on the copper block. This forms a flat surface of the core. Subsequently a press 1160 having the desired configuration is exerted against the top surface to form the desired configuration, such as a conical surface as illustrated in the right side of FIG. 32, of the core face.

Figure 33:
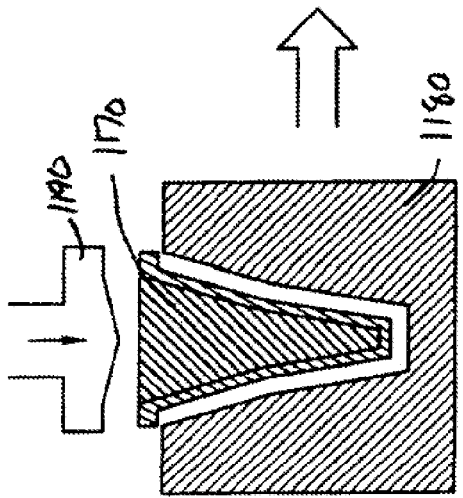
FIG. 33 illustrates steps of a still further alternative manufacturing process.

FIG. 33 illustrates an alternative to FIG. 32 wherein a preformed copper mass 1170 is positioned in the cap, which is held in a mold 1180. Then a pressing force 1190 having the desired configuration is pressed against the top of the flat surface of the preformed copper mass to press the copper mass into securement within the cap. The desired surface configuration of the copper is thereby formed. In other words, FIG. 32 shows a process wherein the copper core is formed by a forging method with a press machine. The sintered MIM cap is held in a metal mold 1140, a copper block 1130 is positioned in the cap and then the copper block is formed to the same shape as the inner surface of the cap by forging with a pressing force 1150. The forging step may be needed to be repeated several times to form the contact surface shape of the tip rear portion. Further, FIG. 33 shows a preformed copper mass, preformed to the similar shape of the cap inner shape. The forging process thereby can be achieved with a smaller force than that of the non-preformed copper block.

Figure 34:
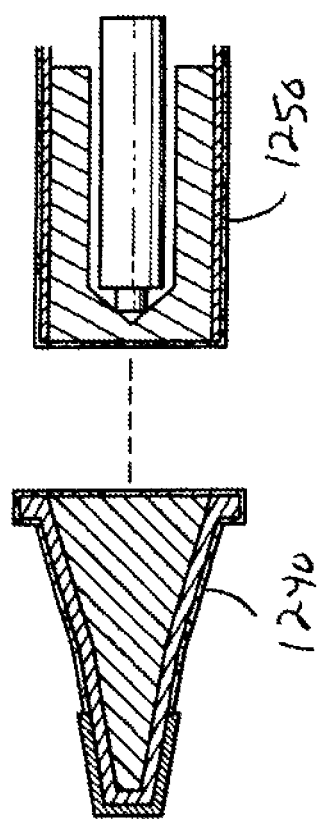
FIG. 34 is a view similar to FIG. 20 illustrating coatings for the tip and of the heating assembly.

Reference is now had to FIG. 34 wherein the coatings of the contact surface between the tip and the heater sleeve are disclosed. Both the tip core and the heater sleeve must be made of materials having good heat conductive properties. Examples of these materials are copper, silver, copper alloy and silver alloy. Generally, copper is the most desirable because it is cheaper than the other materials and has a good heat conductivity. However, copper usually oxidizes when it is heated to high temperatures and the oxidation reduces the heat conductivity. Therefore, it is desirable to surface treat the copper material.

Coating methods which can be used include silver plating, gold plating, nickel plating and chrome plating. Further, Ag—Al—Cu alloy coating, such as disclosed in U.S. application Ser. No. 10/719,001, Publication No. US 2004-0222206 A1, is also effective. Further, the silver plating or gold plating are better for heat conductivity. However, having the same kind of plating on both surfaces of the tip core and the heater sleeve may result in these surfaces adhering to each other and uniting by metal diffusion if silver plating or tin plating is used.

The tip can be plated with chrome 1240 to prevent its iron alloy cap from both oxidizing and copper core wetting or bonding with the solder. On the other hand, the surface of the heater sleeve preferably can be coated with chrome plating, silver plating, gold plating or Ag—Al—Cu alloy layer coating 1250.

Figure 35:
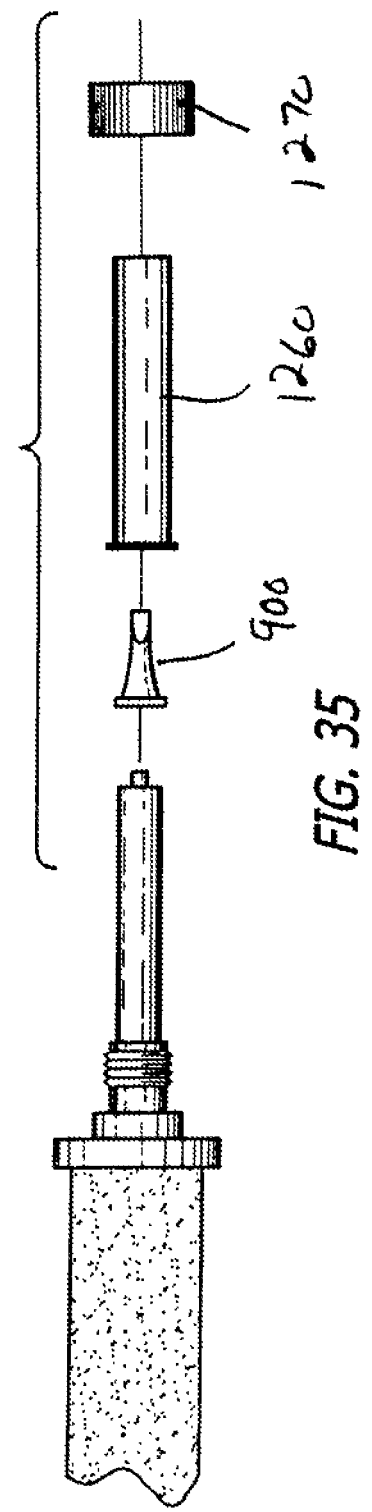
FIG. 35 is an exploded perspective view of the forward portion of the heating assembly similar to FIG. 3, but showing the tip of FIG. 20 or 25.

As previously mentioned, the tip cap can be releasably secured to and against the heater sleeve such as by the constructions similar to or identical to those used to hold the replaceable cap as previously discussed. An example is illustrated in FIG. 35, wherein the soldering tip is releasably attached to the heater sleeve with a stainless steel holding pipe 1260 and a nut 1270.

The replaceable tip concept can also be used in a desoldering iron apparatus, an example of which is shown in Japanese Application 02-108398 (applicant: Hakko K K, and inventor: Yoshimura Hiroshi). The desoldering apparatus therein has been adapted as shown by the apparatus 1300 in FIGS. 36 and 37 to include a replaceable desoldering tip 1310. Referring thereto, the holding pipe 1320, nut 1330, heater assembly 1340, filter pipe 1350, and filter body 1360 are illustrated. Further explanation of the holding pipe and nut assembly is provided by disclosures herein of related assemblies. Additionally, any of the other holding assemblies for the tip caps as disclosed herein can be adapted for this removable/replaceable desoldering tip.

FIG. 38 illustrates a method of forming the desoldering iron tip 1310 of FIGS. 36 and 37. An integrally formed MIM cap 1400 having a body portion 1410, a narrow central sleeve 1420, a base flange 1430 and an end opening is placed in a support or mold 1450. An inner ring 1460 is positioned over the sleeve 1420, and molten copper or the like 1470 is poured into the space between the cap 1400 and the inner ring 1460 and allowed to harden to form the core.

Alternatively, a MIM cap 1500 can be positioned in a support or mold 1510 and a copper core 1520 inserted into it, as depicted in FIG. 39. A press 1530 is then pressed as shown by arrow 1534 into the copper core, as shown in FIG. 40, to form the core in and to the cap. The tip 1310 thereby formed, as illustrated in FIG. 41, is then removed from the support or mold 1510. Other methods of manufacturing the tip and other tip shapes as would be apparent to those skilled in the art from this disclosure are included herein.

From the foregoing detailed description, it will be evident that there are a number of changes, adaptations and modifications of the present invention which come within the province of those skilled in the art. The scope of the invention includes any combination of the elements from the different species or embodiments disclosed herein, as well as subassemblies, assemblies, and methods thereof. However, it is intended that all such variations not departing from the spirit of the invention be considered as within the scope thereof.

What is claimed is:

1. A method of manufacturing a replaceable soldering or desoldering iron tip, comprising:
   preparing a cap having a base opening, including forming the cap by metal injection molding; and
   at least substantially filling the cap through the base opening with a heat conducting material so that a tip core is formed in the cap, the tip core having a core face at the base opening.

2. The method of claim 1 wherein the core face is planar.

3. The method of claim 1 wherein the core face lies in the same plane as the base opening of the cap.

4. The method of claim 1 wherein the core face has a depression for receiving a similarly configured protuberance of a soldering iron heating assembly.

5. The method of claim 4 wherein the depression is conically shaped or defines a slot.

6. The method of claim 1 wherein the heat conducting material is a metal powder or a metal powder and binder.

7. The method of claim 6 wherein the cap is a cap-shaped green compact.

8. The method of claim 7 further comprising after the filling, sintering the cap-shaped green compact and the powder together.

9. The method of claim 7 further comprising after the sintering, forming the core face by at least one of forging, machining and grinding.

10. The method of claim 1 further comprising after the filling, coating a working tip end of the cap with tin or solder and the rest of the outer surface of the tip or cap with chromium.

11. The method of claim 1 wherein the filling includes filling the cap with the heat conducting material in a melted state.

12. The method of claim 1 wherein the filling includes casting the heat conducting material.

13. The method of claim 1 wherein the filling includes the heat conducting material being in the form of a rod or a block.

14. The method of claim 1 wherein the heat conducting material is copper, copper alloy, silver, or silver alloy.

15. The method of claim 1 wherein the preparing includes sintering the cap, and the filling includes the heat conducting material being a powder, and further comprising after the filling, sintering the filled sintered cap.

16. The method of claim 1 further comprising the cap being a sintered cap, the heat conducting material being in rod or block form, and melting the heat conducting material within the sintered cap.

17. The method of claim 1 wherein the filling includes pressing the heat conducting material into the cap.

18. The method of claim 17 wherein the pressing forms the face.

19. The method of claim 17 further comprising after the pressing, forming the face.

20. The method of claim 1 wherein the cap has an inner solder-suction sleeve and the tip thereby defines a desoldering iron tip.

21. The method of claim 1, wherein preparing the cap includes sintering the cap after the metal injection molding.

* * * * *